US012702613B2

(12) United States Patent
Thalman et al.

(10) Patent No.: US 12,702,613 B2
(45) Date of Patent: Aug. 11, 2026

(54) HIP EXOSUIT TO ASSIST HIP FLEXION AND EXTENSION

(71) Applicant: Arizona Board of Regents on behalf of Arizona State University, Scottsdale, AZ (US)

(72) Inventors: Carly Thalman, Mesa, AZ (US); Lily Baye-Wallace, Phoenix, AZ (US); Hyunglae Lee, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 980 days.

(21) Appl. No.: 17/938,491

(22) Filed: Oct. 6, 2022

(65) Prior Publication Data

US 2023/0110572 A1 Apr. 13, 2023

Related U.S. Application Data

(60) Provisional application No. 63/262,270, filed on Oct. 8, 2021.

(51) Int. Cl.
*A61H 1/02* (2006.01)

(52) U.S. Cl.
CPC ... *A61H 1/0244* (2013.01); *A61H 2201/1238* (2013.01); *A61H 2201/1652* (2013.01); *A61H 2201/5061* (2013.01)

(58) Field of Classification Search
CPC ...... A61H 1/0244; A61H 1/0237; A61H 1/02; A61H 1/00; A61H 1/0255;
(Continued)

(56) References Cited

U.S. PATENT DOCUMENTS

| | | | |
|---|---|---|---|
| 9,351,900 | B2 | 5/2016 | Walsh |
| 2010/0292622 | A1 | 11/2010 | Weissleder |

(Continued)

FOREIGN PATENT DOCUMENTS

| | | | | |
|---|---|---|---|---|
| WO | WO-2014194257 A1 * | 12/2014 | | B25J 9/104 |
| WO | WO-2019048800 A1 * | 3/2019 | | A41D 13/018 |
| WO | WO-2019165376 A1 * | 8/2019 | | A41D 13/0543 |

OTHER PUBLICATIONS

Asbeck, Alan T., et al. "Multi-joint soft exosuit for gait assistance." 2015 IEEE International Conference on Robotics and Automation (ICRA). IEEE, 2015.

(Continued)

*Primary Examiner* — Bradley H Philips
*Assistant Examiner* — Tyler A Raubenstraw
(74) *Attorney, Agent, or Firm* — Riverside Law LLP

(57) ABSTRACT

Disclosed herein are systems and methods for assisting hip flexion and extension during human locomotion. A hip exosuit comprises a hip belt comprising one or more removably attached hip anchoring mechanisms, a leg brace, one or more flexion actuators, wherein each of the one or more flexion actuators is attached at a first end to a hip anchoring mechanism and each of the one or more flexion actuators is attached at a second end to the leg brace, and one or more extension actuators, wherein each of the one or more extension actuators is attached at a first end to a hip anchoring mechanism and is attached at a second end to the leg brace. Each of the actuators are configured to contract in response to one or more signal to aid in the gait of the user.

20 Claims, 22 Drawing Sheets

(58) Field of Classification Search
CPC ........ A61H 2201/1238; A61H 2201/12; A61H 2201/1652; A61H 2201/165; A61H 2201/5061; A61H 2201/1642; A61H 3/00; A61H 2201/1409; B25J 9/0006; A41D 13/018; A41D 13/0543
See application file for complete search history.

(56) References Cited

U.S. PATENT DOCUMENTS

| | | | | |
|---|---|---|---|---|
| 2016/0184166 | A1* | 6/2016 | Takenaka | A61H 3/00 623/57 |
| 2018/0056104 | A1 | 3/2018 | Cromie | |
| 2018/0221237 | A1* | 8/2018 | Swift | G16H 50/30 |
| 2019/0029912 | A1* | 1/2019 | Murakami | A61H 3/00 |
| 2019/0030708 | A1* | 1/2019 | Holgate | B25J 9/0006 |
| 2019/0125617 | A1* | 5/2019 | Murakami | A61H 1/0244 |
| 2020/0030179 | A1* | 1/2020 | Schwenn | A61F 5/0193 |
| 2020/0094290 | A1 | 3/2020 | Polygerinos | |
| 2020/0100976 | A1 | 4/2020 | Asbeck | |
| 2020/0206062 | A1* | 7/2020 | Kim | B25J 9/0006 |
| 2020/0230804 | A1* | 7/2020 | Griffith | A61H 1/024 |
| 2021/0069056 | A1* | 3/2021 | Berthet | A61H 9/0078 |
| 2021/0155353 | A1* | 5/2021 | Miller | B25J 9/0006 |
| 2021/0244992 | A1* | 8/2021 | Lear | A61H 3/00 |
| 2021/0298985 | A1* | 9/2021 | Asbeck | B25J 9/0006 |
| 2021/0386574 | A1 | 12/2021 | Lee | |
| 2022/0001241 | A1* | 1/2022 | Cholhan | A62B 33/00 |
| 2022/0410369 | A1* | 12/2022 | Samlali | B25J 9/142 |

OTHER PUBLICATIONS

Browning, Raymond C., et al. "The effects of adding mass to the legs on the energetics and biomechanics of walking." Medicine & Science in Sports & Exercise 39.3 (2007): 515-525.

Ding, Ye, et al. "Biomechanical and physiological evaluation of multi-joint assistance with soft exosuits." IEEE Transactions on Neural Systems and Rehabilitation Engineering 25.2 (2017): 119-130.

Ding, Ye, et al. "IMU-based iterative control for hip extension assistance with a soft exosuit." 2016 IEEE International Conference on Robotics and Automation (ICRA). IEEE, 2016.

Ding, Ye, et al. "Multi-joint actuation platform for lower extremity soft exosuits." 2014 IEEE International Conference on Robotics and Automation (ICRA). Ieee, 2014.

Farris, Dominic James, and Gregory S. Sawicki. "The mechanics and energetics of human walking and running: a joint level perspective." Journal of The Royal Society Interface 9.66 (2012): 110-118.

Ferguson, Rory J., et al. "Hip replacement." The Lancet 392.10158 (2018): 1662-1671.

Jørgensen, Henrik S., et al. "Recovery of walking function in stroke patients: the Copenhagen Stroke Study." Archives of physical medicine and rehabilitation 76.1 (1995): 27-32.

Lee, Jongwoo, et al. "Feasibility of gait entrainment to hip mechanical perturbation for locomotor rehabilitation." 2019 IEEE/RSJ International Conference on Intelligent Robots and Systems (IROS). IEEE, 2019.

Lee, Younbaek, et al. "A flexible exoskeleton for hip assistance." 2017 IEEE/RSJ International Conference on Intelligent Robots and Systems (IROS). IEEE, 2017.

Lewis, Cara L., and Daniel P. Ferris. "Invariant hip moment pattern while walking with a robotic hip exoskeleton." Journal of biomechanics 44.5 (2011): 789-793.

Martini, Elena, et al. "Gait training using a robotic hip exoskeleton improves metabolic gait efficiency in the elderly." Scientific reports 9.1 (2019): 7157.

Merletti, Roberto, and P. J. J. E. K. Di Torino. "Standards for reporting EMG data." J Electromyogr Kinesiol 9.1 (1999): 3-4.

Neckel, Nathan D., et al. "Abnormal joint torque patterns exhibited by chronic stroke subjects while walking with a prescribed physiological gait pattern." Journal of neuroengineering and rehabilitation 5 (2008): 1-13.

Park, Yong-Lae, et al. "Design and control of a bio-inspired soft wearable robotic device for ankle-foot rehabilitation." Bioinspiration & biomimetics 9.1 (2014): 016007.

Perron, Marc, et al. "Three-dimensional gait analysis in women with a total hip arthroplasty." Clinical Biomechanics 15.7 (2000): 504-515.

Quintero, Hugo, et al. "A powered lower limb orthosis for providing legged mobility in paraplegic individuals." Topics in spinal cord injury rehabilitation 17.1 (2011): 25-33.

Tefertiller, Candy, et al. "Initial outcomes from a multicenter study utilizing the indego powered exoskeleton in spinal cord injury." Topics in spinal cord injury rehabilitation 24.1 (2018): 78-85.

Thakur, Chetan, et al. "Soft wearable augmented walking suit with pneumatic gel muscles and stance phase detection system to assist gait." IEEE Robotics and Automation Letters 3.4 (2018): 4257-4264.

Thalman, Carly M., et al. "Design of a soft ankle-foot orthosis exosuit for foot drop assistance." 2019 International Conference on Robotics and Automation (ICRA). IEEE, 2019.

Thalman, Carly M., Lily Baye-Wallace, and Hyunglae Lee. "A soft robotic hip exosuit (SR-HExo) to assist hip flexion and extension during human locomotion." 2021 IEEE/RSJ International Conference on Intelligent Robots and Systems (IROS). IEEE, 2021.

Thalman, Carly M., Tiffany Hertzell, and Hyunglae Lee. "Toward a soft robotic ankle-foot orthosis (sr-afo) exosuit for human locomotion: Preliminary results in late stance plantarflexion assistance." 2020 3rd IEEE International Conference on Soft Robotics (RoboSoft). IEEE, 2020.

Thalman, Carly, and Panagiotis Artemiadis. "A review of soft wearable robots that provide active assistance: Trends, common actuation methods, fabrication, and applications." Wearable Technologies 1 (2020): e3.

Wehner, Michael, et al. "A lightweight soft exosuit for gait assistance." 2013 IEEE international conference on robotics and automation. IEEE, 2013.

Winter, David A. "Overall principle of lower limb support during stance phase of gait." Journal of biomechanics 13.11 (1980): 923-927.

Young, Aaron J., and Daniel P. Ferris. "State of the art and future directions for lower limb robotic exoskeletons." IEEE Transactions on Neural Systems and Rehabilitation Engineering 25.2 (2017): 171-182.

* cited by examiner

HIP EXOSUIT TO ASSIST HIP FLEXION AND EXTENSION

CROSS-REFERENCE TO RELATED APPLICATIONS

This application claims priority to U.S. provisional application No. 63/262,270 filed on Oct. 8, 2021, incorporated herein by reference in its entirety.

BACKGROUND OF THE INVENTION

More than 1 million total hip replacements, also known as total hip arthroplasties, are performed each year with over 300,000 performed in the U.S. annually. Following a total hip arthroplasty, patients can incur a decrease of 20% in hip extensor moment of force during early stance phase, a 14% reduction in gait speed and a decrease of 59% in hip extension range at the end of the stance phase. In addition, stroke is one of the most frequent causes of disability in adults in the United States. Almost two thirds of stroke survivors have initial mobility deficits and cannot walk independently 6 months following a stroke. The hip joint provides 40-50% of the total average positive power for walking at a variety of rates, and injuries to this joint directly or to the spine drastically impact walking capabilities.

As a method of enabling the rehabilitation of gait deteriorating injuries and procedures, exosuits and exoskeletons for hip flexion and extension assistance have been under development across the world over the past decade. Exosuits, a subsection of soft robotics, employ soft materials as opposed to the rigid linkages found in exoskeletons to improve the comfort and safety of the user, as well as decrease assembly cost. Exosuits with a variety of actuators attempt to replicate the hip joint actuation of flexion and extension. Current exosuits address either extension or flexion exclusively with the intention of targeting a particular portion of the gait cycle at the hip.

SUMMARY OF THE INVENTION

A hip exosuit comprising a hip belt comprising one or more removably attached hip anchoring mechanisms, a leg brace, one or more anterior actuators, wherein each of the one or more anterior actuators is attached at a first end to a hip anchoring mechanism, wherein each of the one or more anterior actuators is attached at a second end to the leg brace, and one or more posterior actuators, wherein each of the one or more posterior actuators is attached at a first end to a hip anchoring mechanism, wherein each of the one or more posterior actuators is attached at a second end to the leg brace, wherein each of the plurality of anterior actuators are configured to contract in response to a first signal, and wherein each of the plurality of posterior actuators are configured to contract in response to a second signal.

In some embodiments, the hip exosuit comprises the one or more anterior actuators comprise a first anterior actuator and a second anterior actuator, the hip anchoring mechanism attached to the first anterior actuator is configured to be attached to the hip belt in a proximal location, the hip anchoring mechanism attached to the second anterior actuator is configured to be attached to the hip belt in a distal location, and the first anterior actuator and the second anterior actuator are attached to the leg brace in a distal location and a proximal location, respectively.

In some embodiments, the hip exosuit comprises the one or more posterior actuators comprise a first posterior actuator and a second posterior actuator, the hip anchoring mechanism attached to the first posterior actuator is configured to be attached to the hip belt in a proximal location, the hip anchoring mechanism attached to the second posterior actuator is configured to be attached to the hip belt in a distal location, and the first posterior actuator and the second posterior actuator are attached to the leg brace in a distal location and a proximal location, respectively.

In some embodiments, the hip exosuit further comprising at least a pressure regulator interfaced to the one or more anterior actuators and the one or more posterior actuators through one or more valves.

In some embodiments, at least one of the pressure regulators or the one or more valves are contained in a wearable pouch.

In some embodiments, each hip anchoring mechanism comprises a hook and loop attachment configured to allow adjustment of the length of the attached anterior or posterior actuator.

In some embodiments, the one or more anterior actuators and the one or more posterior actuators each comprise a soft and compliant material.

In some embodiments, the soft and compliant material comprises at least one of neoprene, spandex, and nylon.

In some embodiments, the leg brace comprises a first leg brace and a second leg brace, wherein the first leg brace is attached to the one or more anterior actuators, and wherein the second leg brace is attached to the one or more posterior actuators.

In some embodiments, the hip exosuit further comprising a control circuit configured to produce the first and second signal; and one or more pressure sensors, interfaced to the control circuit.

In some embodiments, the hip exosuit comprises the one or more pressure sensors monitor the pressure in at least one of the one or more valves, the one or more anterior actuators, or the one or more posterior actuators.

A method of assisting a motion of a hip of a subject, the method comprising applying the hip exosuit of claim 1 to the hip of the subject, contracting the plurality of anterior actuators in response to the first signal, and contracting the plurality of posterior actuators in response to the second signal.

In some embodiments, the motion comprises flexion, extension, or a combination thereof.

A hip exosuit comprising a hip belt comprising one or more removably attached hip anchoring mechanisms, a leg brace, a first actuator, and a second actuator, wherein the hip anchoring mechanism attached to the first actuator is configured to be attached to the hip belt in a proximal location and the hip anchoring mechanism attached to the second actuator is configured to be attached to the hip belt in a distal location, wherein the first actuator and the second actuator are attached to the leg brace in a distal location and a proximal location, respectively, and wherein the first and second actuator are configured to contract in response to a signal.

In some embodiments, the hip anchoring mechanism comprises a hook-and-loop attachment.

In some embodiments, the hook-and-loop attachment is configured to allow adjustments in length of the first actuator or the second actuator.

In some embodiments, the first actuator and the second actuator are flag fabric pneumatic artificial muscles (ff-PAMs).

In some embodiments, each ff-PAM comprises a plurality of pressure chambers.

In some embodiments, the plurality of pressure chambers are configured to be separated via a seal.

In some embodiments, the plurality of pressure chambers are configured to be inflated and deflated through the use of at least a valve.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1:
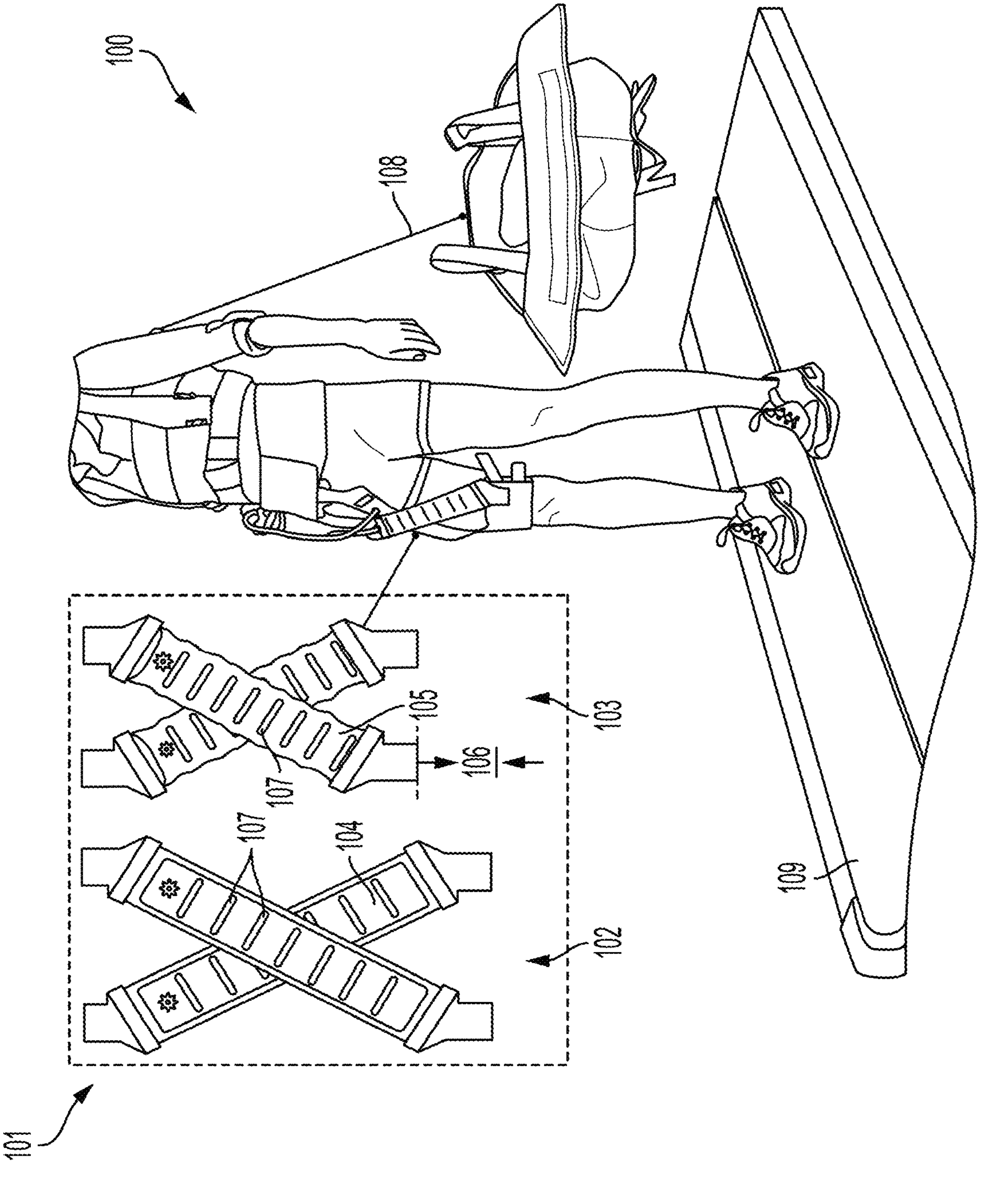
FIG. 1 depicts a soft robotic hip exosuit system, in accordance with an embodiment.

It is to be understood that the figures and descriptions of the present invention have been simplified to illustrate elements that are relevant for a clearer comprehension of the present invention, while eliminating, for the purpose of clarity, many other elements found in systems and methods for a hip exosuit to assist hip flexion and extension. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. Although any methods and materials similar or equivalent to those described herein can be used in the practice or testing of the present invention, the preferred methods and materials are described.

As used herein, the singular forms "a," "an," and "the" include plural references, unless the context clearly dictates otherwise. Thus, for example, reference to a "cell" is a reference to one or more cells and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of".

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components as well as the range of values greater than or equal to 1 component and less than or equal to 3 components. Similarly, a group having 1-5 components refers to groups having 1, 2, 3, 4, or 5 components, as well as the range of values greater than or equal to 1 component and less than or equal to 5 components, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

All percentages, parts and ratios are based upon the total weight of the compositions and all measurements made are at about 25° C., unless otherwise specified.

Disclosed herein are exosuits comprising flat fabric pneumatic artificial muscle (ff-pAM) actuators to assist in hip flexion and extension for human walking. In extension, the exosuit mimics the shape and behavior of the gluteus maximus (GM), semimembranosus (SM), and biceps femoris (BF). In flexion, the exosuit mimics the shape and behavior of the iliacus (IL), rectus femoris (RF) and vastus medialis (VM). The exosuit uses a pair of full-length ff-PAMs for both flexion and extension, with different heights of intersection for the actuators. Flexion refers to forward movement while extension is a straightening movement that increases angles between body parts. In some embodiments, the ff-PAMs are in an 'X' formation (X-ff-PAM). In order to evaluate the effectiveness of the exosuit on user comfort and assistance, hip range of motion (ROM) and muscle activity during walking were monitored using a motion capture system and surface electromyography sensors.

In an embodiment, the exosuit may comprise a hip belt comprising one or more removably attached hip anchoring mechanisms, a leg brace, one or more flexion actuators, wherein each of the one or more flexion actuators is attached at a first end to a hip anchoring mechanism, wherein each of the one or more flexion actuators is attached at a second end to the leg brace, and one or more extension actuators, wherein each of the one or more extension actuators is attached at a first end to a hip anchoring mechanism, wherein each of the one or more extension actuators is attached at a second end to the leg brace, wherein each of the plurality of flexion actuators are configured to contract in response to a first signal, and wherein each of the plurality of extension actuators are configured to contract in response to a second signal.

Disclosed herein is a method of assisting a motion of a hip of a subject, the method comprising applying the hip exosuit of claim 1 to the hip of the subject, contracting the plurality of flexion actuators in response to the first signal, and contracting the plurality of extension actuators in response to the second signal. In some embodiments, the motion comprises flexion, extension, or a combination thereof. Any sort of signal described herein may be received or transmitted from a microcontroller or control circuit as described below.

In some embodiments, a hip exosuit may comprise a hip belt comprising one or more removably attached hip anchoring mechanisms, and a leg brace. In certain embodiments, the hip exosuit may further comprise one or more anterior actuators, wherein each anterior actuator is attached at a first end, fixedly or removably, to a hip anchoring mechanism, wherein each of the one or more anterior actuators is attached at a second end to the leg brace. In some embodiments, the hip exosuit may further comprise one or more posterior actuators, wherein each posterior actuator is attached at a first end, fixedly or removably, to a hip anchoring mechanism, and wherein each of the one or more posterior actuators is attached at a second end to the leg brace.

In certain embodiments, each of the plurality of anterior actuators may be configured to contract in response to a first signal. In an embodiment, the first signal may be, for example, from about 50% to about 90% of a gait cycle. In some embodiments, each of the plurality of posterior actuators may be configured to contract in response to a second signal. In an embodiment, the second signal may be, for example, from about 10% to about 45% of a gait cycle.

In some embodiments, the one or more anterior actuators described herein may comprise a first anterior actuator and a second anterior actuator. In certain embodiments, the hip anchoring mechanism attached to the first anterior actuator may configured to be attached to the hip belt in a proximal location, and the hip anchoring mechanism attached to the second anterior actuator is configured to be attached to the hip belt in a distal location. In some embodiments, the first anterior actuator and the second anterior actuator may be attached to the leg brace in a distal location and a proximal location, respectively.

In certain embodiments wherein the one or more posterior actuators comprise a first posterior actuator and a posterior extension actuator, the hip anchoring mechanism attached to the first posterior actuator may be configured to be attached to the hip belt in a proximal location, and the hip anchoring mechanism attached to the second posterior actuator may be configured to be attached to the hip belt in a distal location. In some embodiments, the first posterior actuator and the second posterior actuator may be attached to the leg brace in a distal location and a proximal location, respectively.

In certain embodiments, the one or more anterior actuators may be configured to actively aid in flexion hip torque.

In certain embodiments, the one or more posterior actuators may be configured to actively aid in extension hip torque.

In certain embodiments, the hip exosuit may comprise either anterior or posterior anchors. As described herein, anchors may be any sort of attachment that provides stability and is secured firmly in its position. Alternatively, both anterior and posterior anchors may be included, but only one set activated at a time. These configurations may be made based on the need of the patient.

In some embodiments, the hip exosuit may further comprise at least a pressure regulator interfaced to the one or more anterior actuators and the one or more posterior actuators through one or more valves. In certain embodiments, at least one of the pressure regulators or the one or more valves may be contained in a wearable pouch attached to the exosuit or embedded in. In some embodiments, at least one of the pressure regulators or the one or more valves are contained in a wearable pouch.

In certain embodiments, each hip anchoring mechanism comprises a hook-and-loop attachment, which may be configured to allow adjustment of the length of the attached anterior or posterior actuator. A "hook-and-loop attachment" is a fastening system which uses two sides of material to stick together.

In certain embodiments, the one or more anterior actuators and the one or more posterior actuators may each independently comprise a material that is soft, compliant, or a combination thereof. In some embodiments, the material may comprise, for example, neoprene, spandex, nylon, or a combination thereof.

In some embodiments, the leg brace may comprise a first leg brace and a second leg brace. In certain embodiments, the first leg brace may be attached to the one or more anterior actuators, and the second leg brace may be attached to the one or more posterior actuators.

In certain embodiments, the hip exosuit may further comprise a control circuit configured to produce the first and second signal; and one or more pressure sensors, which may be interfaced to the control circuit. In certain embodiments, the one or more pressure sensors are configured to monitor the pressure in at least one of: the one or more valves, the one or more anterior actuators, and/or the one or more posterior actuators.

In some embodiments, the hip exosuit described herein may have a weight of less than or equal to about 1.8 kg. In certain embodiments, the hip exosuit described herein may have a hip flexion of about 0.56 Nm/kg at about 51.6% of a gait cycle. In some embodiments, the hip exosuit described herein may assist the flexion of the IL, VM, and/or RF muscles. In certain embodiments, the hip exosuit described herein may have a hip extension of about 0.66 Nm/kg at about 5.5% of a gait cycle. In some embodiments, the hip exosuit described herein may assist the extension of the GM and/or BF muscles. In an embodiment, the hip exosuit described herein may have a minimum range of motion (ROM) of about 40° (about 30° flexion; about 10° extension).

In some embodiments, a method of assisting a motion of a hip of a subject may comprise to the hip of the subject a hip exosuit as described herein. The method may further comprise at least one of contracting the plurality of anterior actuators in response to the first signal, as described herein; and contracting the plurality of posterior actuators in response to the second signal, as described herein. In certain embodiments, the motion may comprise flexion, extension, or a combination thereof.

FIG. 1 depicts a soft robotic hip exosuit system 100, in accordance with an embodiment. The system is configured to aid in rehabilitation of the hip. The system comprises one or more anterior actuators 101 attached to the anterior of a user's leg. In some embodiments, each actuator is a flag fabric pneumatic artificial muscle (ff-PAM). In some embodiments, each ff-PAM comprises multiple pressure chambers wherein the pressure chambers may be deflated 104 or inflated 105. Pressure chambers are separated via a seal 107. In some embodiments, the seal is a heat seal. When the pressure chambers 104 are deflated, the actuator 102 is longest. When the pressure chambers 105 are inflated, the actuator 103 reduces in length 106. This change in length creates a change in tension between any apparatuses interfaced on either side of the actuator. In some embodiments the system may additionally comprise one or more posterior actuators (not shown) attached to the posterior of a user's leg comprising similar features as the one or more anterior actuators.

In some embodiments, each actuator is pressurized using compressed air. In other embodiment, other gases or fluids are used. In some embodiments, instantaneous pressure is provided through one or more valves. In some embodiments, the valves are pneumatic valves. In alternative embodiments, the valves are solenoid valves. In some embodiments, the valves are configured to be worn on the body of the user. In alternative embodiments, the valves may be external from the user and connected to the actuators via a tether. Valves may be stored within a valve pouch 108. In some embodiments, the valve pouch 108 may be configured to be worn about the torso or waist. In some embodiments, the valve pouch 108 may properly balance the valves on the user to prevent changes to the user's gait while walking. Valve pouch 108 may be the wearable pouch as described herein.

In some embodiments, the system may further comprise a treadmill 109. In further embodiments, the treadmill 109 may be a split belt treadmill. In some embodiments, a split belt treadmill allows the system to monitor and collect measurements relevant to the gait of the user.

In further embodiments, the exosuit is configured to actuate the posterior set of ff-PAM actuators from 10-45% of the gait cycle to assist hip extension, and the anterior ff-PAM actuator set from 50-90% of the gait cycle to assist hip flexion. In some embodiments, the ff-PAMs cannot be slacked and are attached in tension to maximize force output. In a prime embodiment, both the flexion and extension actuators are configured to be in an 'X' orientation. This configuration hugs the user's thigh more closely than designs that run distally down the back of the leg, and instead mimics the shape of the Iliacus and the Rectus Femoris, the most crucial muscles for hip flexion.

In some embodiments, the posterior actuator may also be in an 'X' orientation to guarantee complete range of motion inflexion and prevent potential hip abduction generated by force applied to one side of the hip over the other. This orientation of extension actuators may be shaped like the Adductor Magnus and Vastus Lateralis, hugging the leg more closely than prior exosuit designs.

Figure 2A:
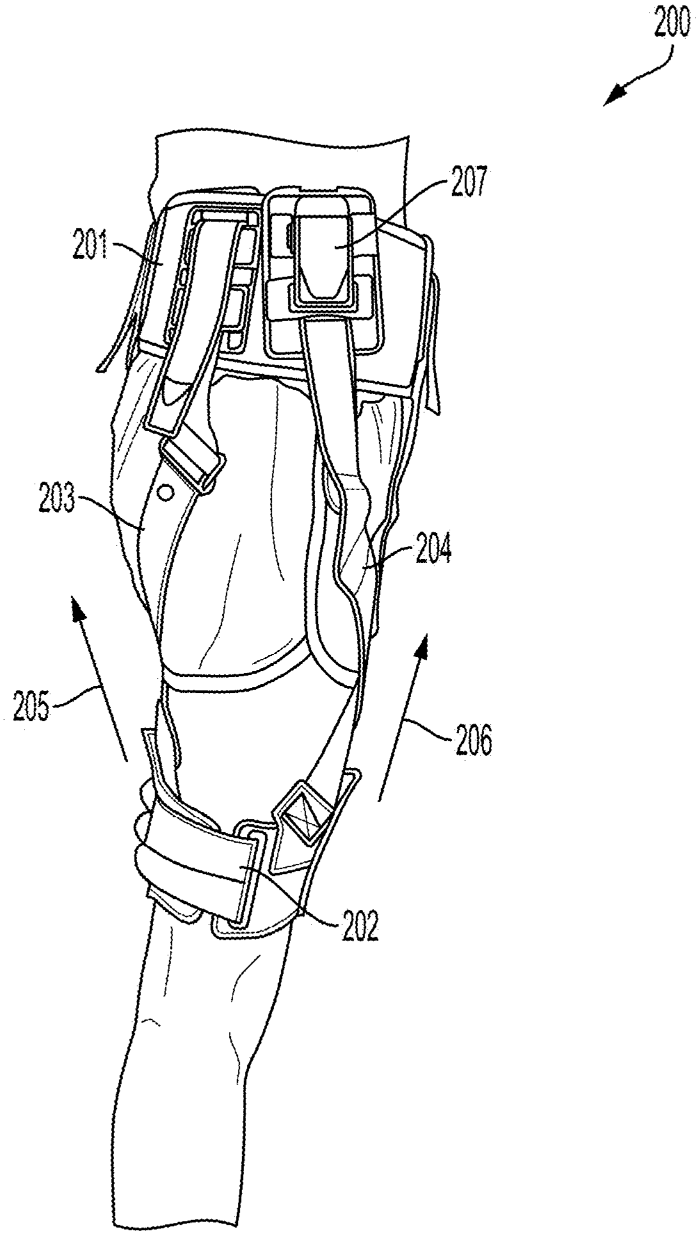
FIG. 2A depicts a side view of the exosuit, in accordance with an embodiment.

FIG. 2A depicts a side view of the exosuit 200, in accordance with an embodiment. The exosuit 200 may comprise a hip belt 201, configured to be worn around the user's waist and an adjustable leg brace 202, configured to be worn around the user's leg. In some embodiments, the adjustable leg brace 202 is worn above the knee. Each posterior 203 and anterior 204 actuator is attached on an upper end to the hip belt 201 and a lower end to the adjustable leg brace 202. In some embodiments, the actuators are ff-PAMs. In some embodiments, each actuator is attached to the hip belt 207 at an adjustable anchor point 207. In further embodiments, the adjustable anchor point 207 comprises a hook-and loop fastener. The horizontal and vertical placements of the actuators are adjustable using the adjustable anchor point. The length of the actuator attachment to the belt is variable and the placement of that appendage can be shifted anywhere on a hook-and-loop fastener. Modifications to placement of the actuators to accommodate users of different height or shape.

In some embodiments, by contracting the posterior actuators 203 an extension force 205 is generated. By contracting the anterior actuators 204 a flexion force 206 is generated. In some embodiments, these forces may be individually generated to coincide with portions of the user's gait to properly aid in their motion.

Figure 2B:
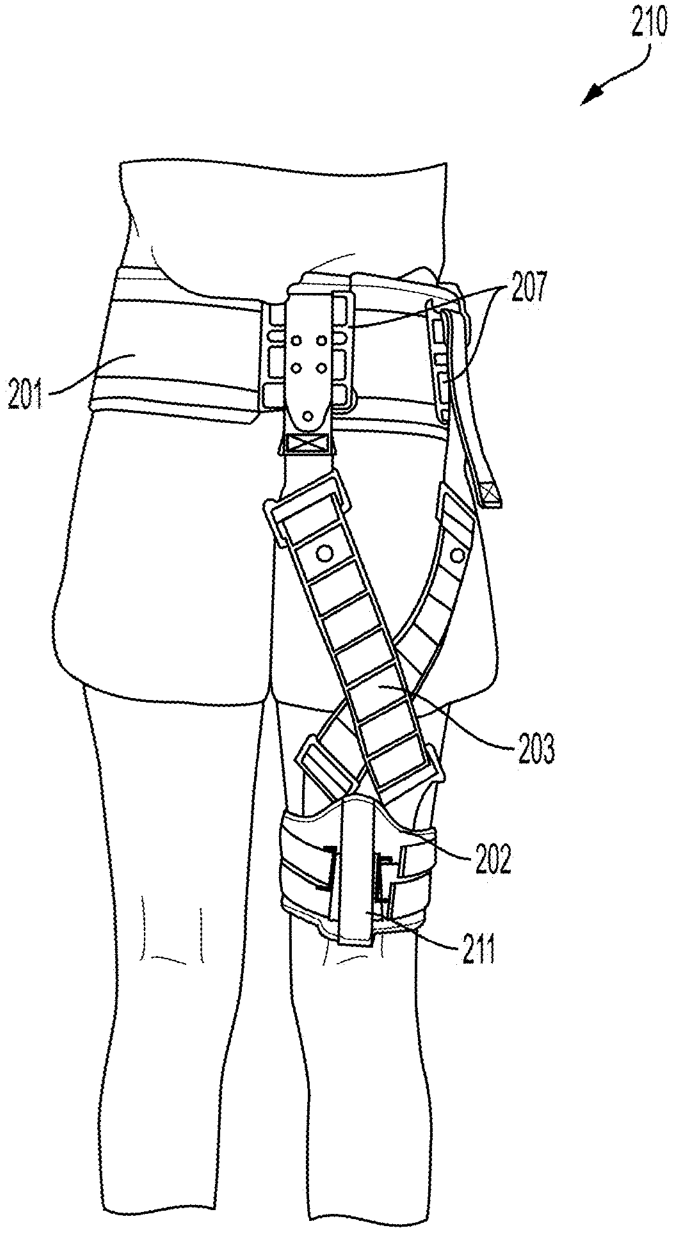
FIG. 2B depicts a rear view of the exosuit, in accordance with an embodiment.

FIG. 2B depicts a rear view of the exosuit 210, in accordance with an embodiment. An anchor point 211 interfaces the posterior actuators 203 to the adjustable leg brace 202. In some embodiments, a single anchor point receives all of the one or more posterior actuators. In alternative embodiments, each posterior actuator has an independent anchor point. In some embodiments, the posterior actuators may be adjusted length, either individually or uniformly, at the one or more anchor points 211.

Figure 2C:
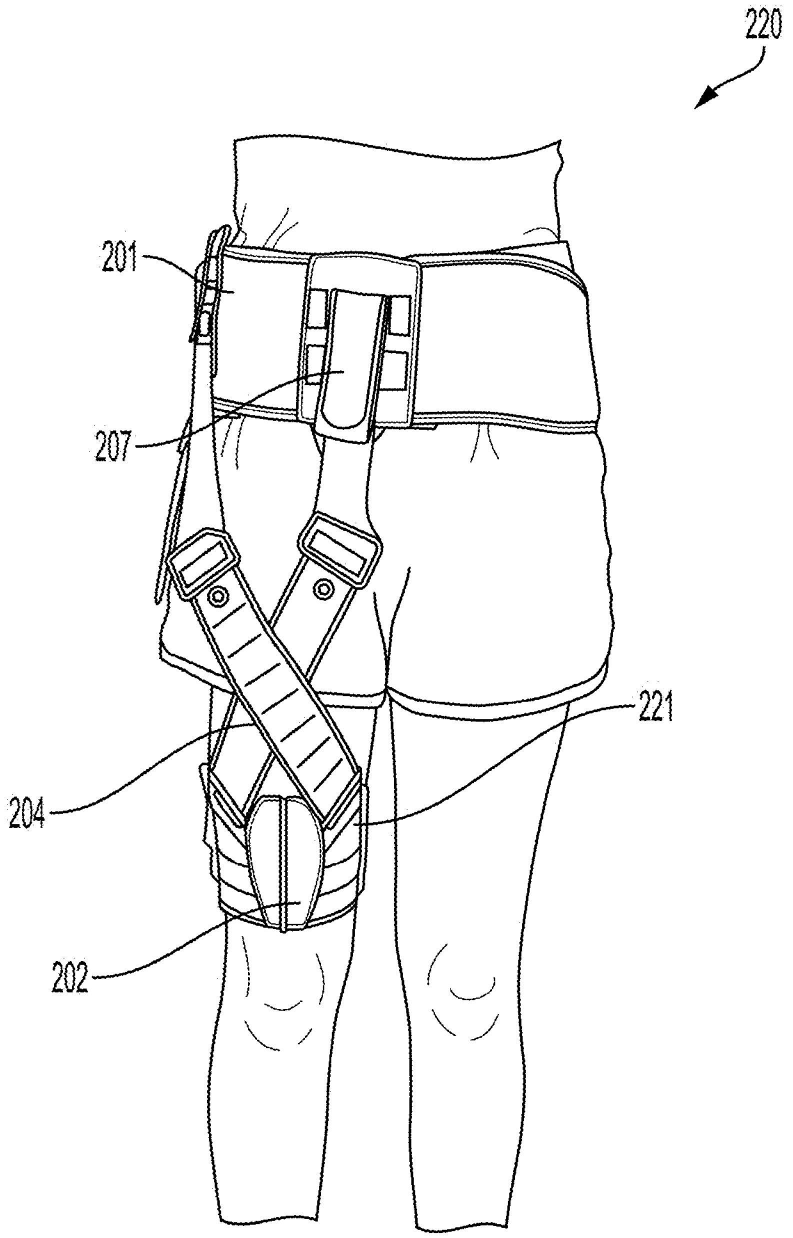
FIG. 2C depicts a front view of the exosuit, in accordance with an embodiment.

FIG. 2C depicts a front view of the exosuit 220, in accordance with an embodiment. An anchor point 221 interfaces the anterior actuators 204 to the adjustable leg brace 202. In some embodiments, a single anchor point receives all of the one or more anterior actuators. In alternative embodiments, each anterior actuator has an independent anchor point. In some embodiments, the anterior actuators may be adjusted length, either individually or uniformly, at the one or more anchor points 221.

Figure 2D:
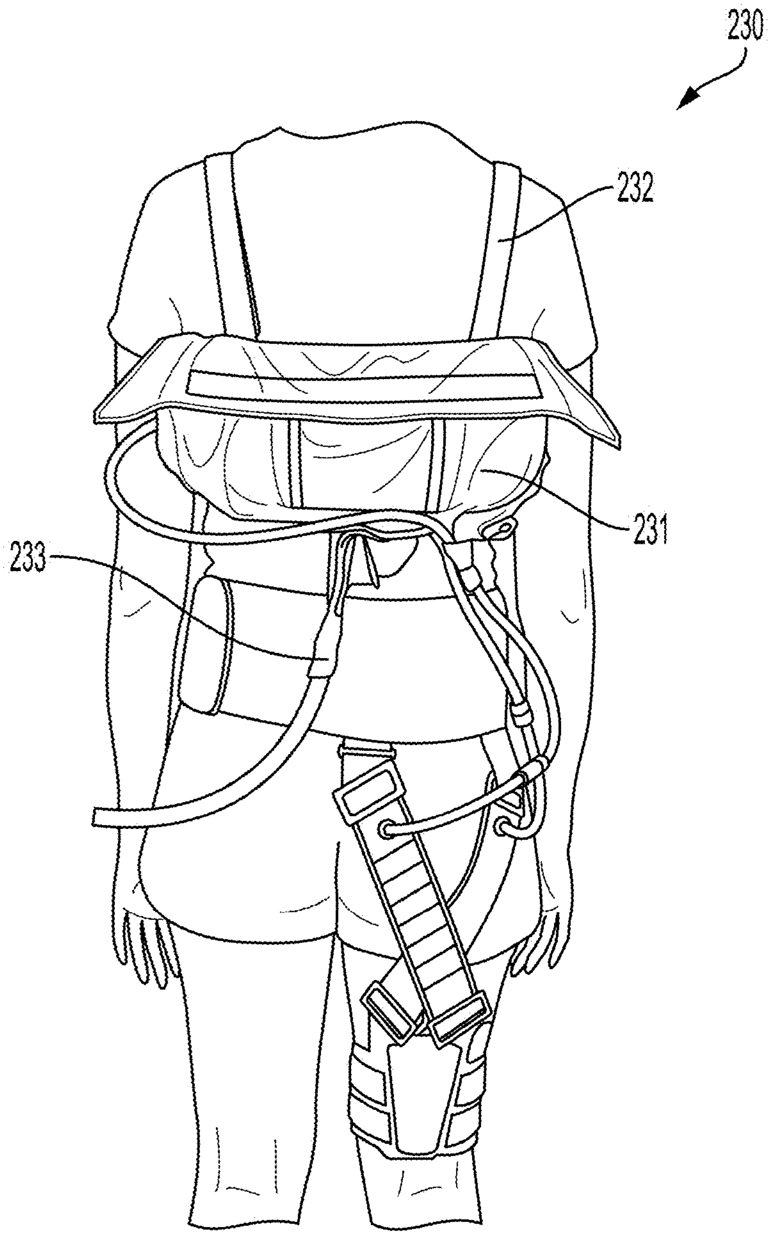
FIG. 2D depicts an upper back view of the exosuit, in accordance with an embodiment.

FIG. 2D depicts an upper back view of the exosuit 230, in accordance with an embodiment. In some embodiments, a series of valves for providing instantaneous pressure to the posterior and anterior actuators may be stored in a valve pouch 231, configured to be worn similarly to a backpack with straps 232. In alternative embodiments, the valve pouch may be worn in other locations or be external from the user. In many embodiments, it may be impractical to generate the pressure for operating the actuators on the user. As a result, some embodiments may feature a tether 233 to an external source of energy, such as an air compressor. In further embodiments, the tether may further comprise one or more cables for power, control, and/or data analysis related to the exosuit 230.

Figure 3:
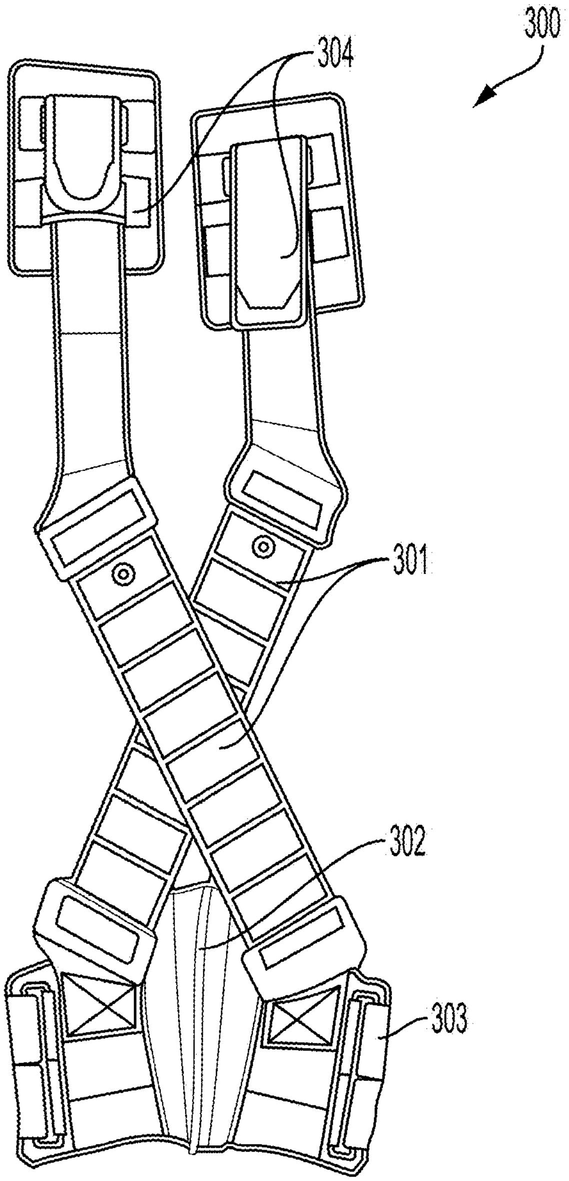
FIG. 3 depicts a front portion of the exosuit, in accordance with an embodiment.

FIG. 3 depicts a front portion of the exosuit 300, in accordance with an embodiment. In some embodiments, two anterior actuators 301 may be in an 'X' configuration. In some embodiments, the anterior actuators 301 may be attached to a front portion of an adjustable leg brace 302. In further embodiments, the front portion of the adjustable leg brace 302 may comprise one or more fasteners 303 for attaching to a rear portion of the adjustable leg brace. The fasteners may be hook-and-loop fasteners or any other fastener which allow the adjustable leg brace to adjust in diameter to fit the user. In some embodiments, each anterior actuator 301 also comprises an adjustable hip anchor 304 configured to fasten onto a hip belt.

Figure 4:
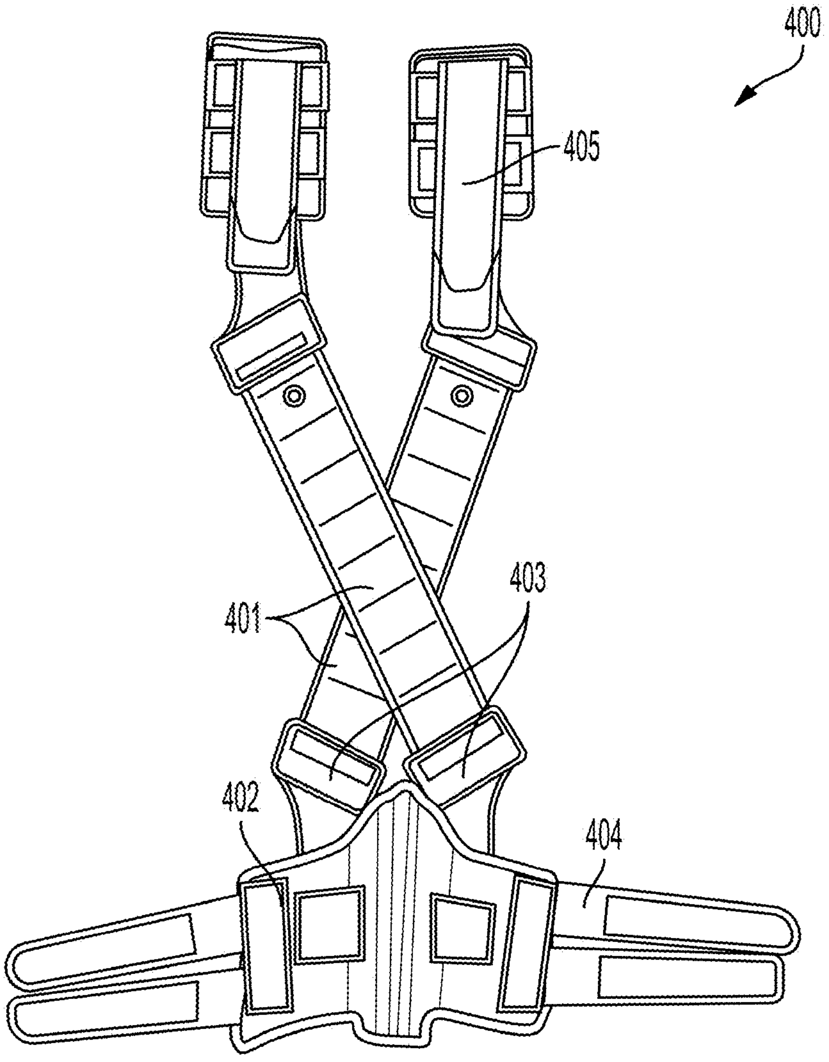
FIG. 4 depicts a rear portion of the exosuit, in accordance with an embodiment.

FIG. 4 depicts a rear portion of the exosuit 400, in accordance with an embodiment. In some embodiments, two posterior actuators 401 may be in an 'X' configuration. In some embodiments, the posterior actuators 401 may be attached to a rear portion of an adjustable leg brace 402 via one or more leg brace anchor points 403. In further embodiments, the rear portion of the adjustable leg brace 402 may comprise one or more fasteners 404 for attaching to the front portion of the adjustable leg brace. The fasteners may be hook-and-loop fasteners or any other fastener which allow the adjustable leg brace to adjust in diameter to fit the user. In some embodiments, each posterior actuator 401 also comprises an adjustable hip anchor 405 configured to fasten onto a hip belt.

Figure 5:
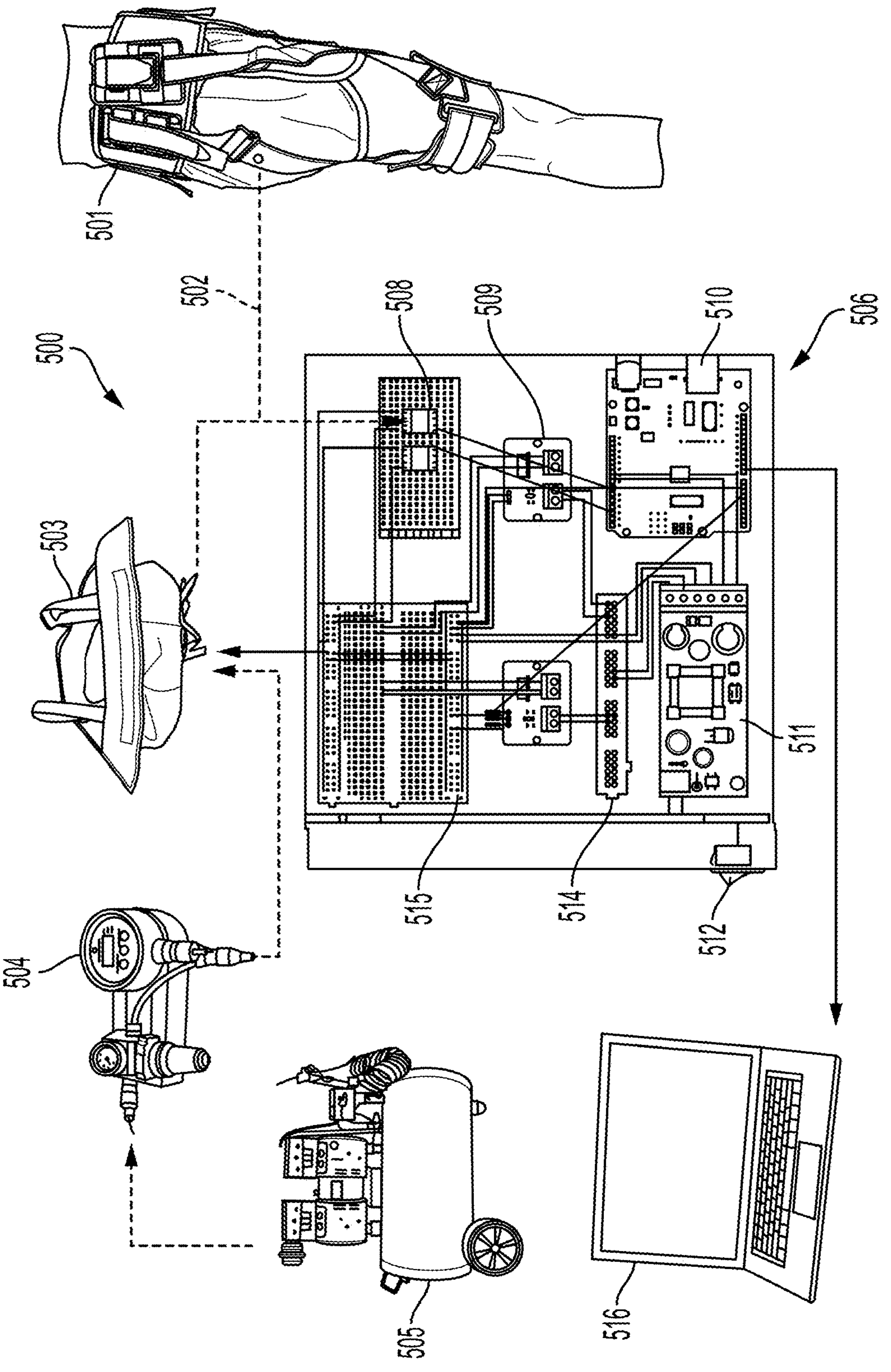
FIG. 5 depicts an illustrative system diagram for a system that aids in hip rehabilitation, in accordance with embodiment.

FIG. 5 depicts an illustrative system diagram 500 for a system that aids in hip rehabilitation, in accordance with embodiment. The system comprises an exosuit 501, as disclosed herein, comprising one or more ff-PAMs. The ff-PAMs are pressurized through one or more instantaneous pressure lines 502 regulated by one or more valves in a valve pouch 503 worn by the user. In some embodiments, there are two instantaneous pressures lines 502, with one pressuring the anterior actuators and the other pressuring the posterior actuators. In some embodiments, the worn components of the system receive air pressure from an external air compressor 506 via a pressure regulator 504.

In some embodiments, the system may further comprise a control circuit 506. The control circuit 506 may comprise one or more pressure sensors 508 integrated to the pressure lines 502 within the exosuit 501, one or more MOSFETS 509 for controlling the one or more valves in the valve pouch 503, a microcontroller 510, a voltage regulator interfaced to a power source, a power switch 512, and assorted power rails 514/515. In some embodiments, the microcontroller may be integrated to an external computer 516 or server through a network interface. In some embodiments, the network interface may be used to transmit data to the computer 516. In some embodiments, the network interface may be used to receive programming instructions from the computer 516.

Figure 6:
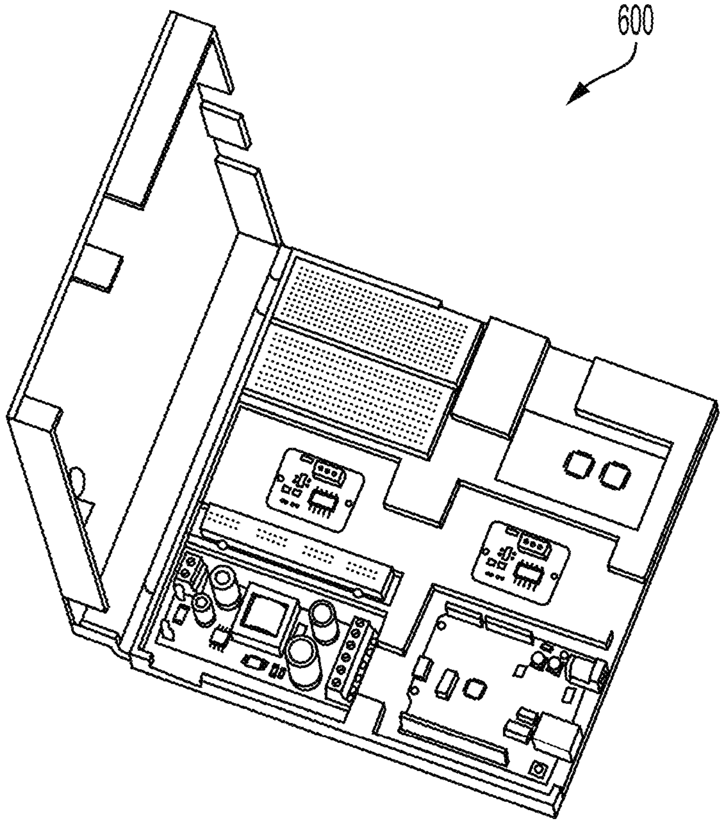
FIG. 6 depicts a control box, in accordance with an embodiment.

Referring briefly to FIG. 6, the control circuit may be encased in a control box 600. In some embodiments, the control box may be integrated into the exosuit. In alternative embodiments, the control box is external from the exosuit.

Figure 7:
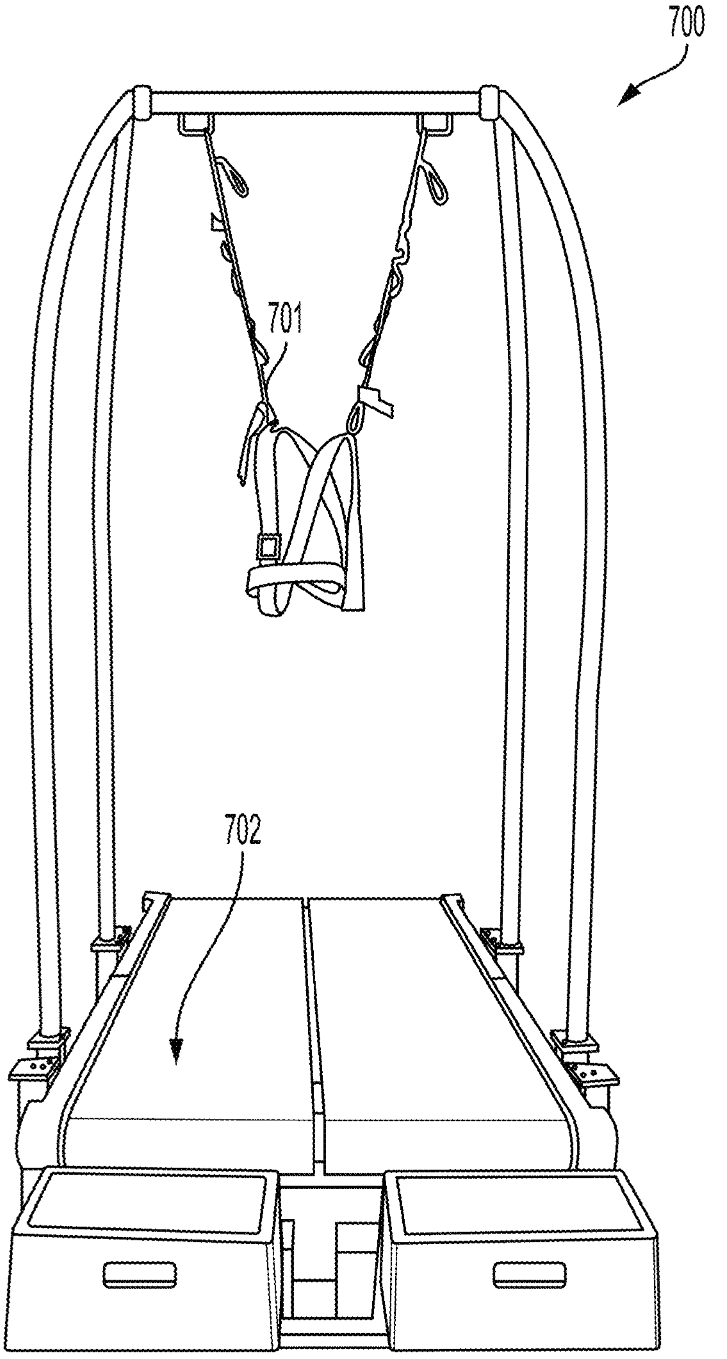
FIG. 7 depicts a split belt treadmill acting as part of a hip rehabilitation system, in accordance with an embodiment.

FIG. 7 depicts a split belt treadmill 700 acting as part of a hip rehabilitation system, in accordance with an embodiment. In some embodiments, the treadmill 700 may comprise a safety harness 701 for protecting the user and keeping them centered on the treadmill 700. In some embodiments, the treadmill 700 may comprise one or more force plates integrated the control circuit. Measurements from these force plates allow the microcontroller to calculate the gait of the user to properly time assistance using the actuators. In alternative embodiments, other sensors, such as cameras may be used to detect the gait of the user.

Figure 8:
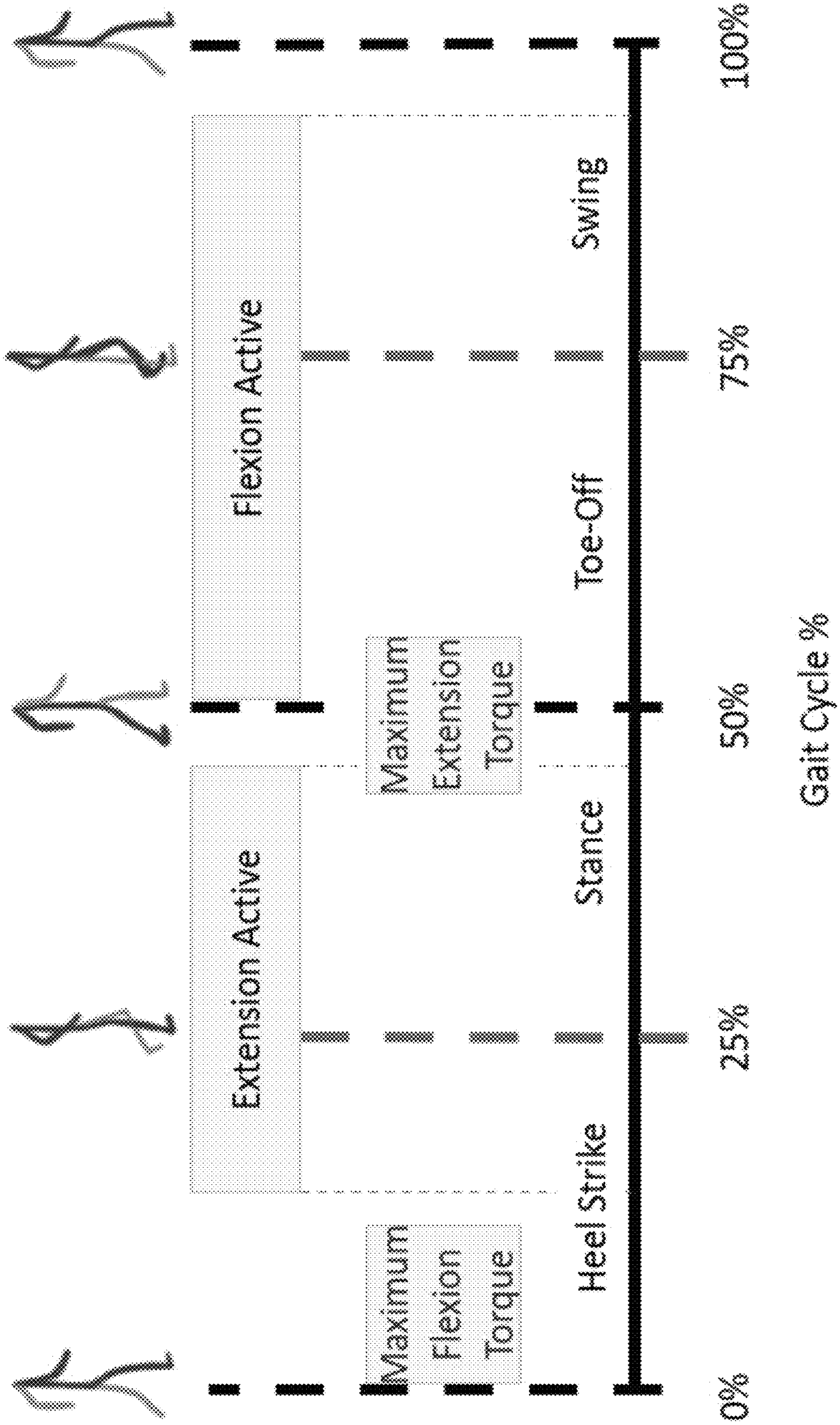
FIG. 8 depicts the system state across a user's gait cycle, in accordance with an embodiment.

FIG. 8 depicts the system state across a user's gait cycle, in accordance with an embodiment. The timing of each perturbation was critical to ensure the exosuit was providing proper assistance and not impeding other stages of the gait cycle. In order to do this, the sensors may be used to determine the user's cadence. In some embodiments, the system may take the average cadence over a set of previous steps and calculate the timing of the next applied perturbation. In some embodiments, the posterior actuator was activated and deactivated at 10% and 45% of the gait cycle, respectively, while the anterior actuator was activated and deactivated at 50% and 90% of the gait cycle, respectively.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 9:
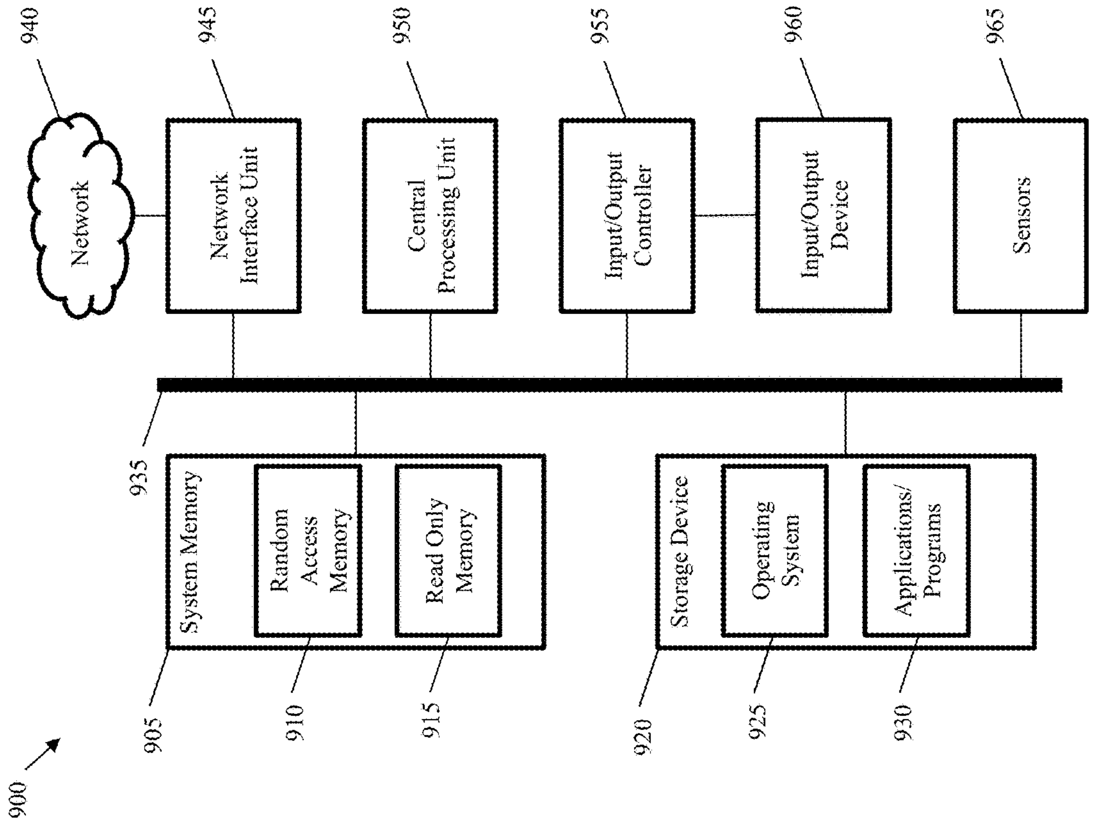
FIG. 9 is an exemplary embodiment of a computing device that may be used herein.

FIG. 9 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 9 depicts an illustrative computer architecture for a computer 900 for practicing the various embodiments of the invention. The computer architecture shown in FIG. 9 illustrates a conventional personal computer, including a central processing unit 950 ("CPU"), a system memory 905, including a random-access memory 910 ("RAM") and a read-only memory ("ROM") 915, and a system bus 935 that couples the system memory 905 to the CPU 950. A basic input/output system containing the basic routines that help to transfer information between elements within the computer, such as during startup, is stored in the ROM 915. The computer 900 further includes a storage device 920 for storing an operating system 925, application/program 930, and data.

The storage device 920 is connected to the CPU 950 through a storage controller (not shown) connected to the bus 935. The storage device 920 and its associated computer-readable media provide non-volatile storage for the computer 900. Although the description of computer-readable media contained herein refers to a storage device, such as a hard disk or CD-ROM drive, it should be appreciated by those skilled in the art that computer-readable media can be any available media that can be accessed by the computer 900.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information, and which can be accessed by the computer.

According to various embodiments of the invention, the computer 900 may operate in a networked environment using logical connections to remote computers through a network 940, such as TCP/IP network such as the Internet or an intranet. The computer 900 may connect to the network 940 through a network interface unit 945 connected to the bus 935. It should be appreciated that the network interface unit 945 may also be utilized to connect to other types of networks and remote computer systems.

The computer 900 may also include an input/output controller 955 for receiving and processing input from a number of input/output devices 960, including a keyboard, a mouse, a touchscreen, a camera, a microphone, a controller, a joystick, or other type of input device. Similarly, the input/output controller 955 may provide output to a display screen, a printer, a speaker, or other type of output device. The computer 900 can connect to the input/output device 960 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 920 and/or RAM 910 of the computer 900, including an operating system 925 suitable for controlling the operation of a networked computer. The storage device 920 and RAM 910 may also store one or more applications/programs 930. In particular, the storage device 920 and RAM 910 may store an application/program 930 for providing a variety of functionalities to a user. For instance, the application/program 930 may comprise many types of programs such as a word processing application, a spreadsheet application, a desktop publishing application, a database application, a gaming application, internet browsing application, electronic mail application, messaging application, and the like. According to an embodiment of the present invention, the application/program 930 comprises a multiple functionality software application for providing word processing functionality, slide presentation functionality, spreadsheet functionality, database functionality and the like.

The computer 900 in some embodiments can include a variety of sensors 965 for monitoring the environment surrounding and the environment internal to the computer 900. These sensors 965 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples, therefore, specifically point out the preferred embodiments of the present invention and are not to be construed as limiting in any way the remainder of the disclosure.

Example 1: Parallel ff-PAMs

Figure 10B:
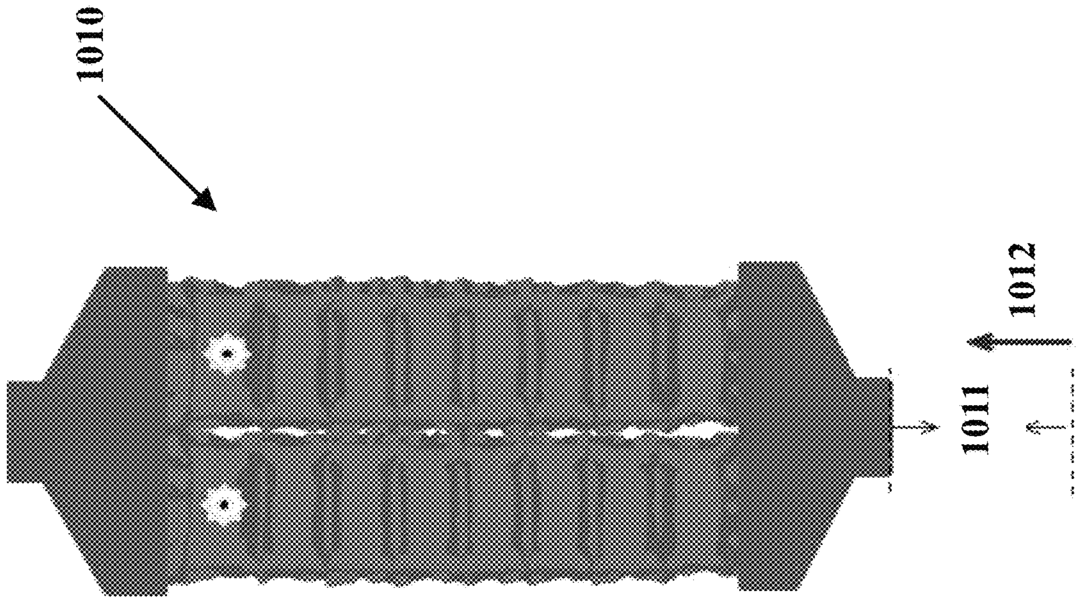
FIG. 10B depicts two parallel ff-PAMs in an inflated state, in accordance with an embodiment.
Figure 10A:
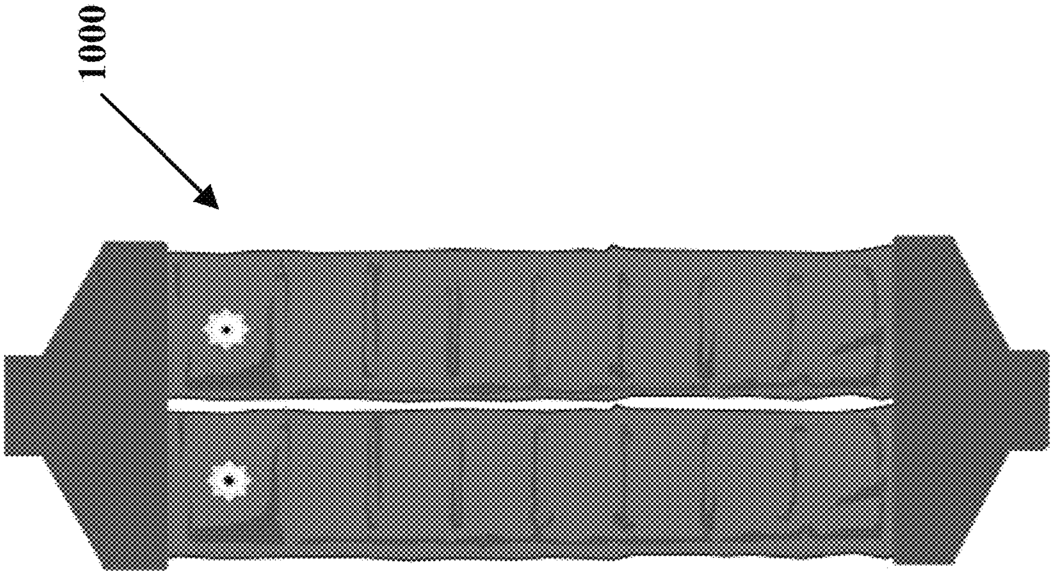
FIG. 10A depicts two parallel ff-PAMs in a deflated state, in accordance with an embodiment.
Figure 11:
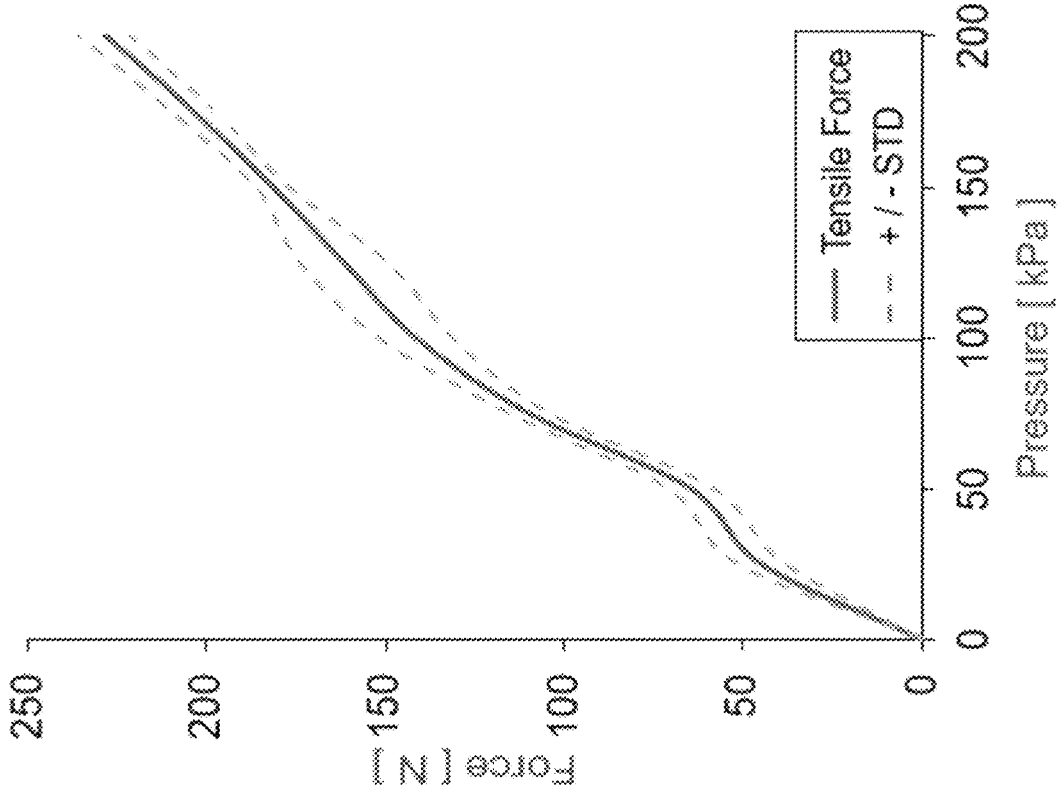
FIG. 11 depicts the tensile force based on the pressure applied to two parallel ff-PAMs.

To evaluate the most effective orientation of the ff-PAMs, both parallel and 'X' configurations were considered. FIG. 10A depicts two parallel ff-PAMs in a deflated state 1000. FIG. 10B depicts the same ff-PAMs in an inflated state 1010. The contraction 1011 caused by the inflations results in the corresponding force 1012 along the length of the ff-PAMs. FIG. 11 depicts the resulting tensile force based on the pressure applied to the ff-PAM for an example ff-PAM. The parallel actuators reached a peak force of 189.2±8.2 N at an instantaneous pressure of 200 kPa over a 0.3 sec window, with an unloading response time of 0.46 sec.

Example 2: X-ff-PAMs

Figure 12B:
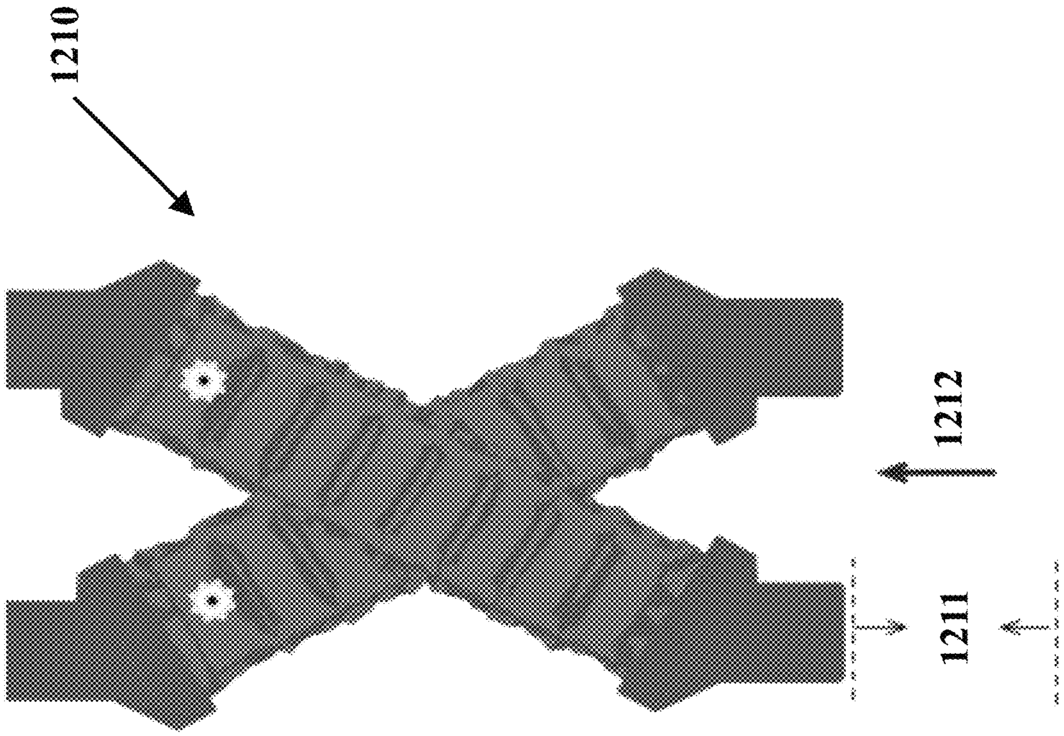
FIG. 12B depicts two 'X' oriented ff-PAMs in an inflated state, in accordance with an embodiment.
Figure 12A:
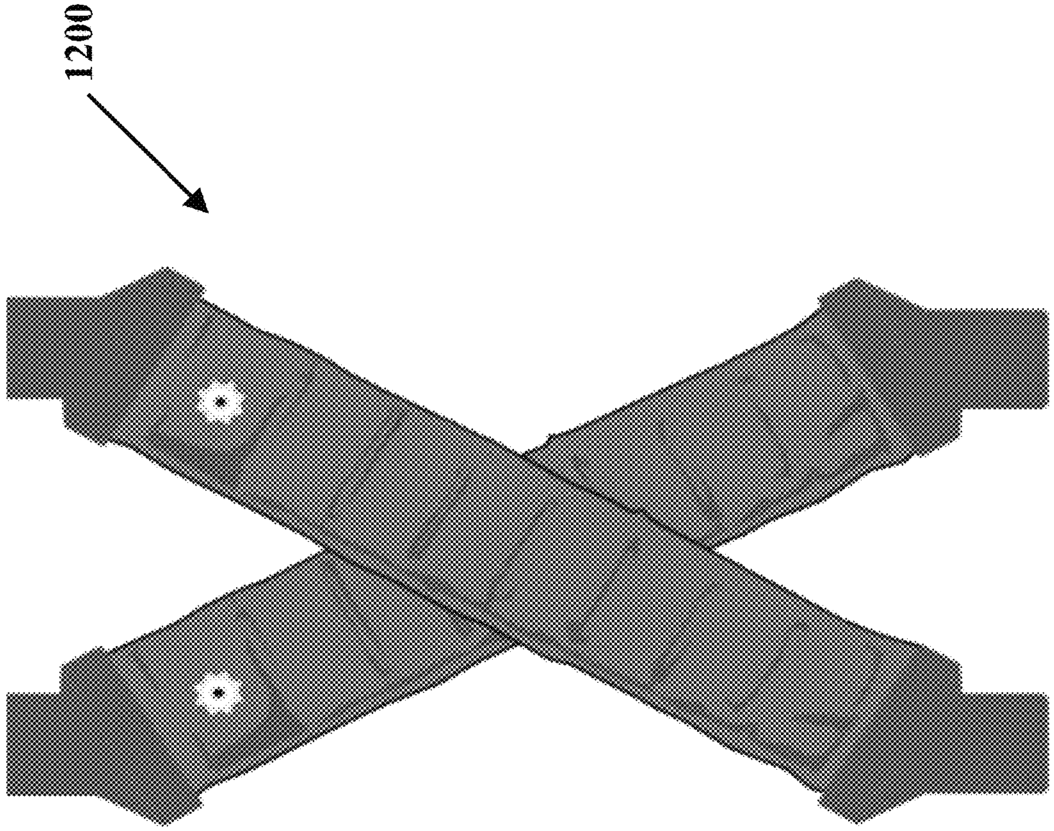
FIG. 12A depicts two 'X' oriented ff-PAMs in a deflated state, in accordance with an embodiment.
Figure 13:
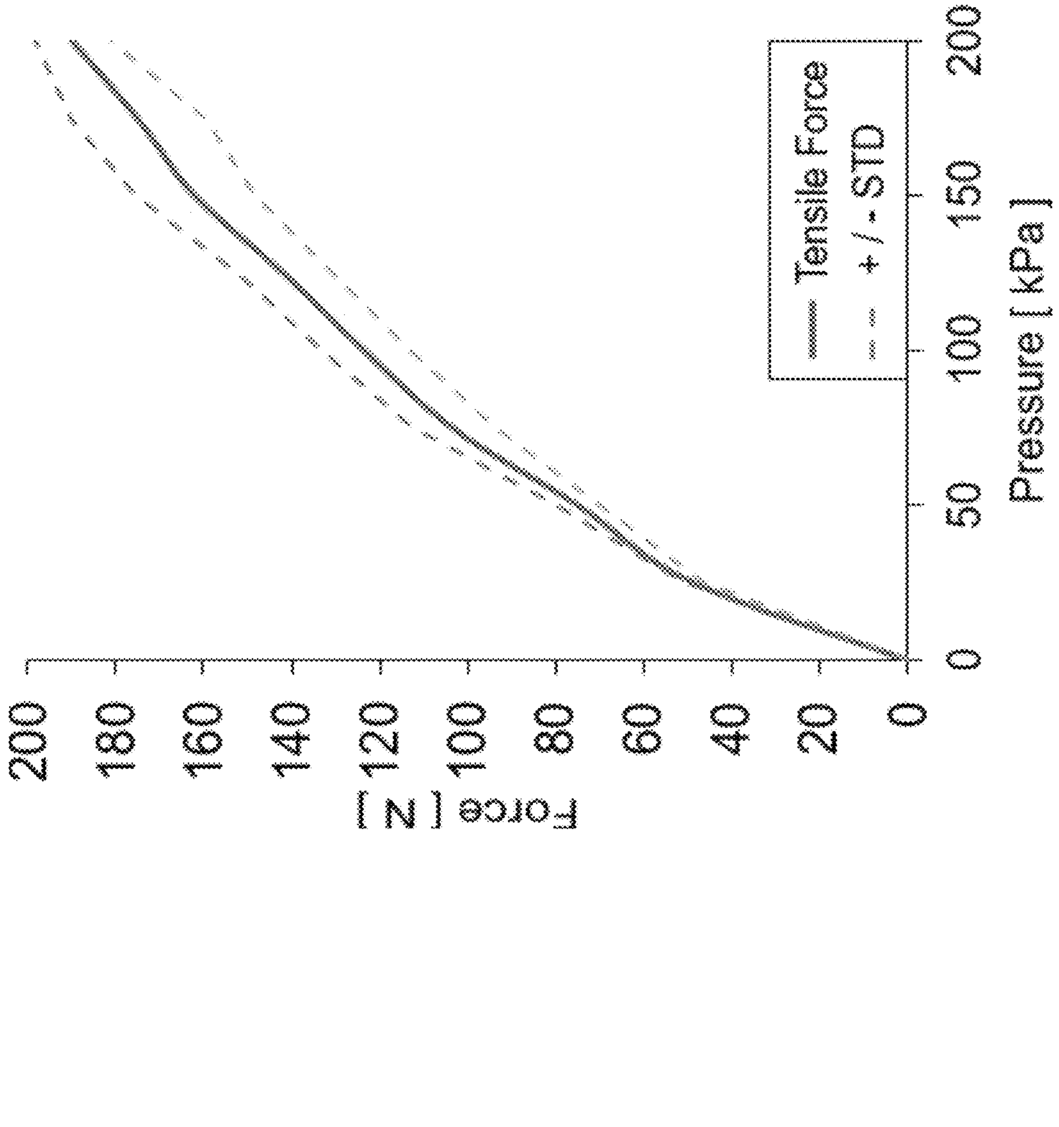
FIG. 13 depicts the tensile force based on the pressure applied to two parallel ff-PAMs.
Figure 14:
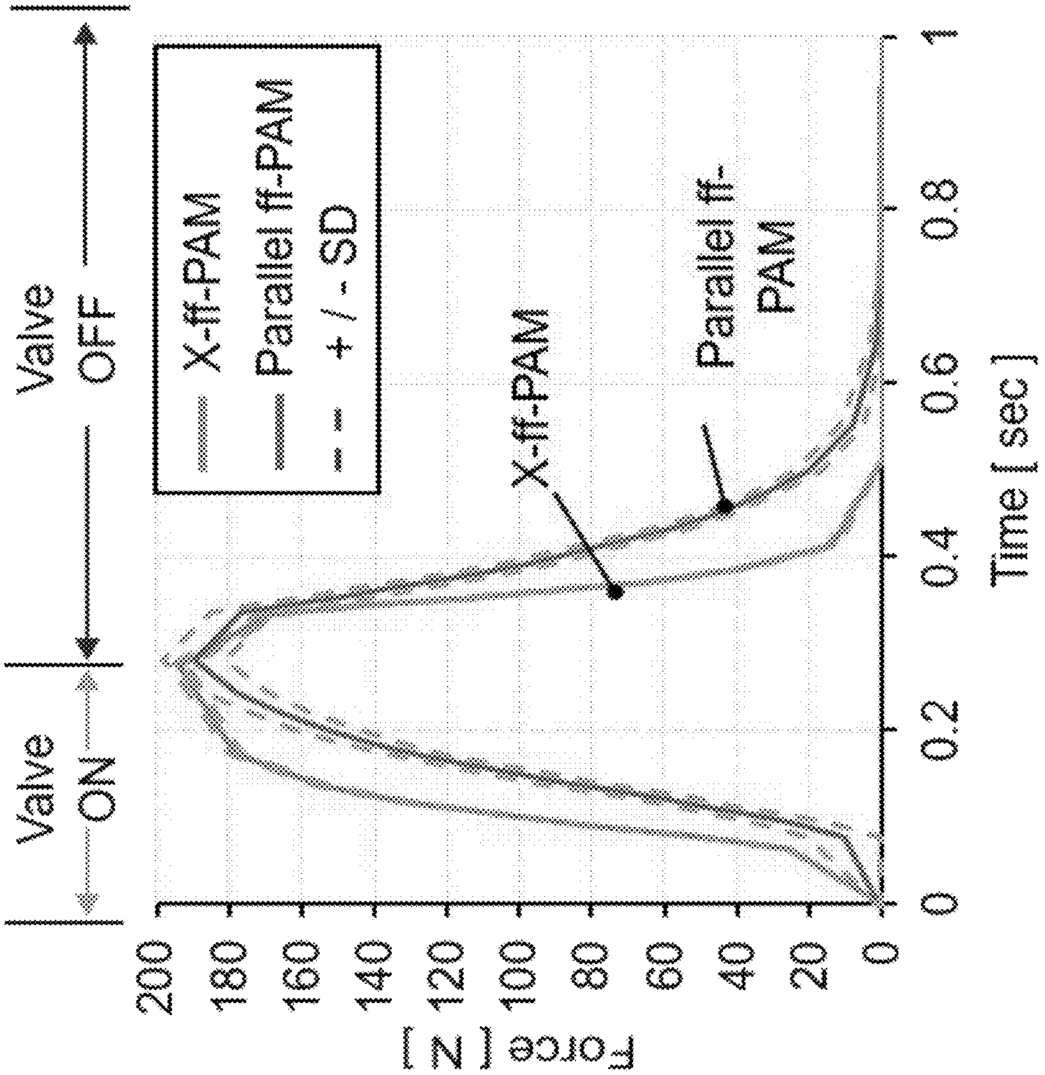
FIG. 14 depicts the tensile force output of the parallel ff-PAM compared to the X-ff-PAM recorded as a dynamic response to instantaneous pressure at 200 kPa.
Figure 15:
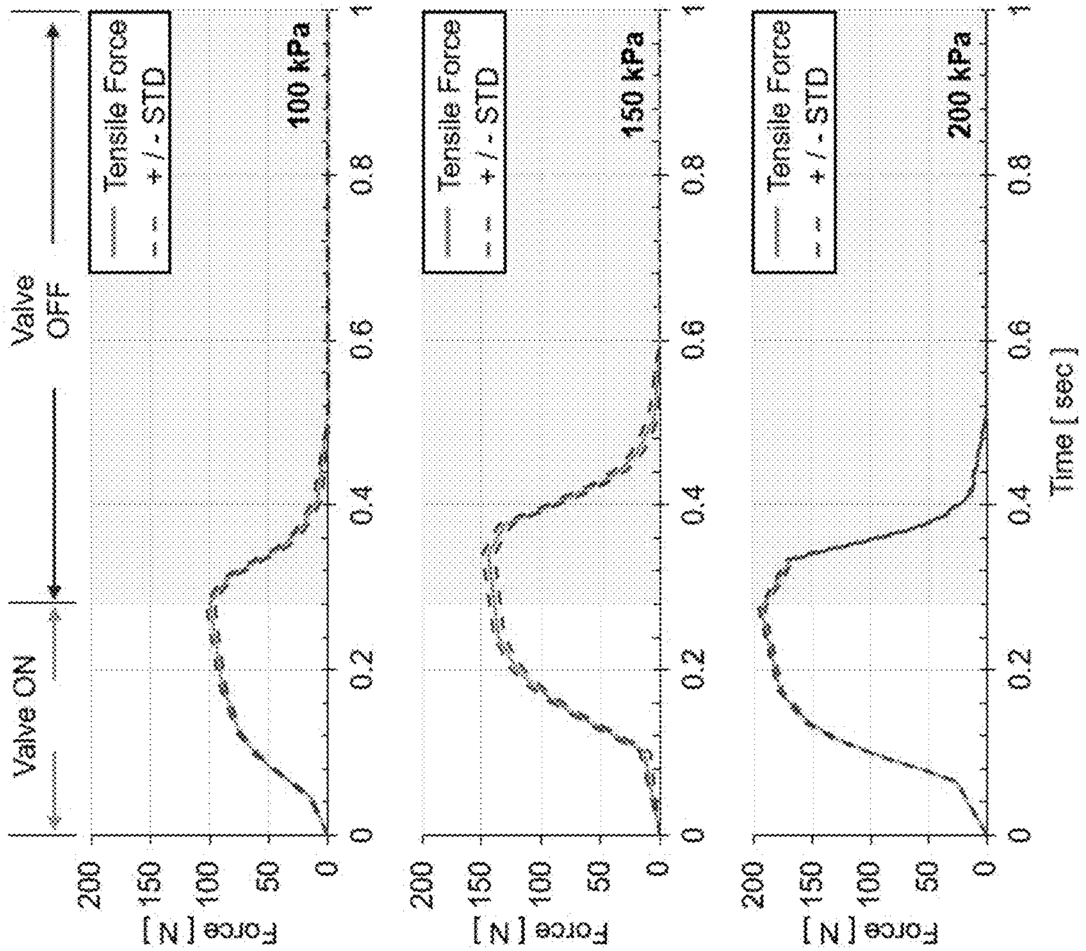
FIG. 15 depicts the tensile force of the X-ff-PAM recorded as a dynamic response to instantaneous pressure at 100, 150, and 200 kPa.

FIG. 12A depicts two 'X' oriented ff-PAMs in a deflated state 1200. FIG. 12B depicts the same ff-PAMs in an inflated state 1210. The contraction 1211 caused by the inflations results in the corresponding force 1212 along the length of the ff-PAMs. FIG. 13 depicts the resulting tensile force based on the pressure applied to the ff-PAM for an example ff-PAM. The X-ff-PAM reached a peak tensile force of 191.2±4.6 N at 200 kPa and an unloading time of 0.25 sec. FIG. 14 depicts the tensile force output of the parallel ff-PAM compared to the X-ff-PAM recorded as a dynamic response to instantaneous pressure at 200 kPa. FIG. 15 depicts the tensile force of the X-ff-PAM recorded as a dynamic response to instantaneous pressure at 100, 150, and 200 kPa.

The parallel and X-ff-PAMs operated at similar levels, with the X-ff-PAM outperforming the parallel ff-PAM with a shorter response time.

An additional study was conducted with three (n=3) healthy participants (age: 21-27, height: 1.68-1.88 m, weight: 47.6-83.9 kg, and leg length: 0.79-1.05 m) recruited following the procedures for healthy participants as approved by the Institutional Review Board of Arizona State University (STUDY00012099). Two experimental protocols were implemented, each on a different day, and each subject participated in both experiments. The objective of the experiment was to assess the effectiveness of the X-ff-PAM to assist in hip flexion and extension during walking. A surface electromyography measurement (EMG) system recorded the muscle activity of the iliacus (IL), rectus femoris (RF), biceps femoris (BF), and gluteus maximus (GM), major contributors to successful hip flexion and extension. A motion capture system allowed for a continuous monitoring of hip angle for comparison to normal ROM at the joint. Reflective markers were placed at the anterior and posterior points of the pelvis, and the center of the thigh to track hip angle in the sagittal plane.

Prior to the main walking experiment, the surface EMG sensors were placed on the belly of the four muscles described above and maximum voluntary contraction (MVC) of each muscle was measured as per standard International Society of Electrophysiology and Kinesiology (ISEK) protocols. Preferred walking speed was determined by increasing treadmill speeds by steps of 0.1 m/s until the subject indicated the pace was quicker than their natural cadence, then decreased in steps of 0.1 m/s until the subject indicated it was too slow. The final preferred walking speed was selected by averaging the two values and was between 1 and 1.3 m/s for all participants, well within normal bounds of human walking. The main experiment was performed under 3 conditions: (1) no exosuit, (2) passive exosuit, and (3) active exosuit. In the active exosuit condition, the flexion X-ff-PAM was pressurized at 200 kPa for 50-90% of the gait cycle and depressurized for the remainder, thus assisting only in the late stance phase. The extension X-ff-PAM was pressurized at 200 kPa for 10-45% of the gait cycle and depressurized for the remainder, assisting only in the terminal swing to loading response. Both actuators were pressurized through valves mounted on the back of the participant. The participant walked for 2 minutes for each experimental condition and a minimum 3-minute resting period was provided between each trial to prevent any potential muscle fatigue. Three active trials were run for each participant, and the cleanest data was chosen out of the three. Force plate, motion capture, and EMG data were used to determine gait cycle, kinematics, and muscle activity, respectively. The motion capture system was used to monitor joint angles at a measurement rate of 250 Hz to confirm the exosuit did not significantly decrease the hip range of motion (ROM) in the sagittal plane during walking trials. EMG data was collected at 2 kHz and filtered using the second-order Butterworth lowpass filter with a cutoff frequency of 20 Hz and synchronized with kinematic data and force plate data to monitor improvements in muscle expenditure in hip flexion in the IL and RF, and hip extension in the BF and GM muscles. To determine reduction in muscle activity, the area under the curve was taken between the no exosuit and active conditions from 10-45% of the gait cycle for the hip extensors (GM and BF) and 50-90% of the gait cycle for hip flexors (IL and RF).

Figure 16:
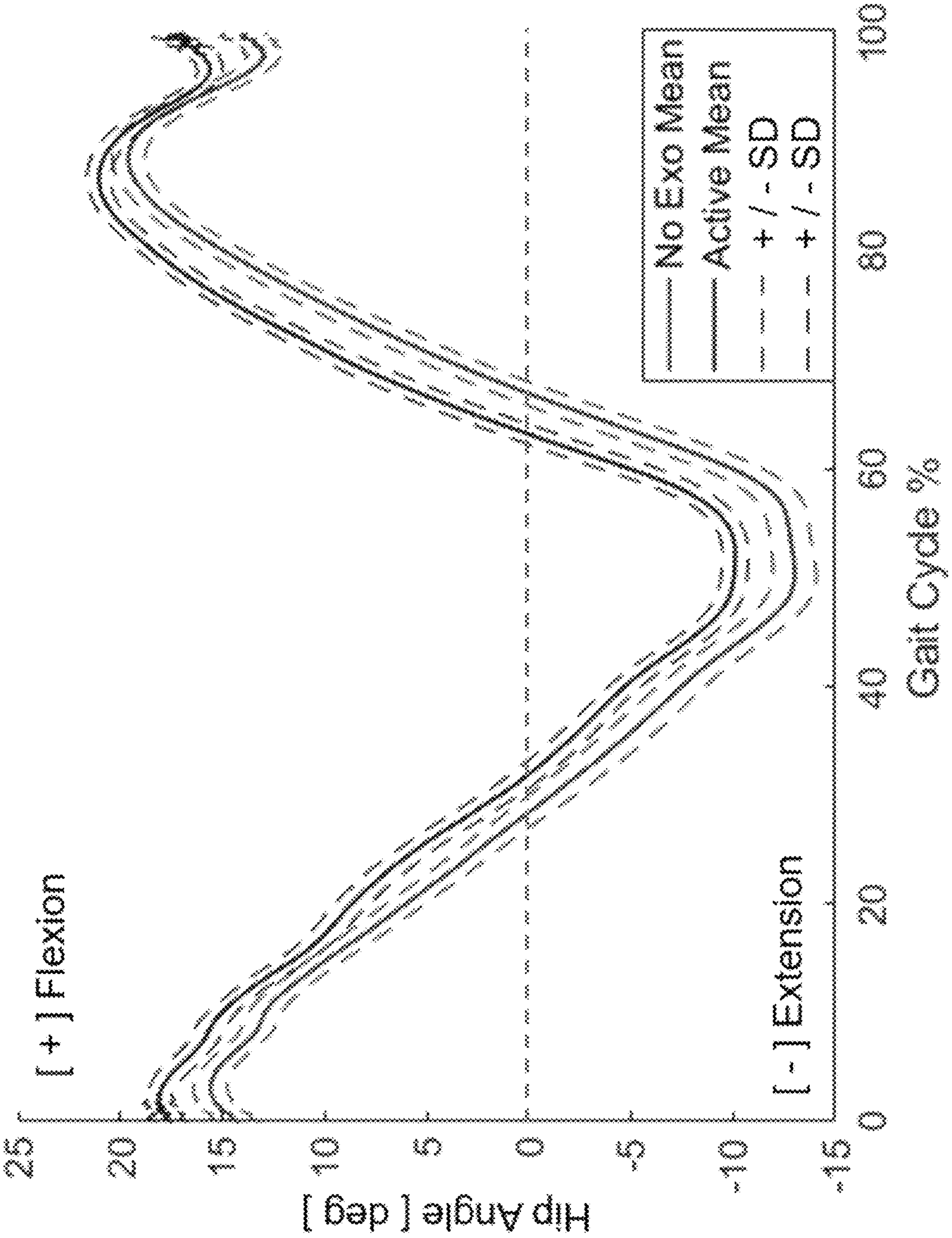
FIG. 16 depicts experimental results of range of motion (ROM) monitoring at the hip joint with and without an embodiment of an exosuit for a representative subject.

The results this study showed kinematic data and muscle data to verify the effectiveness of exosuit function in reducing muscle activation without significantly altering normal ROM. FIG. 16 depicts experimental results of range of motion (ROM) monitoring at the hip joint with and without the exosuit for a representative subject. Each participant showed a hip angle profile that did not drastically alter from their normal ROM in the no exosuit condition.

Figure 17:
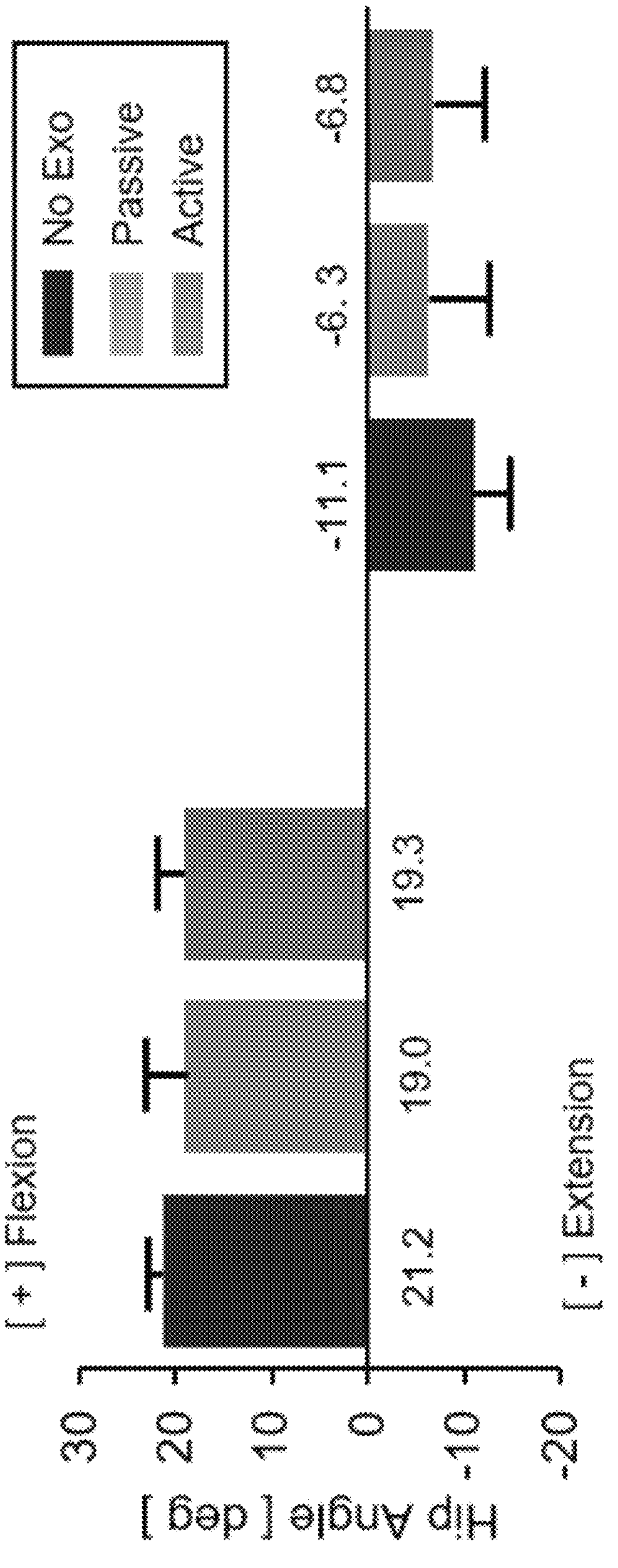
FIG. 17 depicts experimental results of hip angle for all participants for all experimental conditions, which confirm that there was minimal impact on ROM at the hip during active use of an exosuit, in accordance with an embodiment.

FIG. 17 depicts experimental results of hip angle for all participants for all experimental conditions, which confirm that there was minimal impact on ROM at the hip during active exosuit usage. Error bars represent mean±standard deviation (SD) across all three participants. The peak flexion angle at the hip was 21.2±0.5° with no exosuit, 19.0±3.9° with the passive exosuit, and 19.3±3.0° with the active exosuit. The peak extension angle at the hip was measured as −11.0±2.8° without the exosuit, −6.3±5.0° with the passive exosuit, and −6.8±3.8° with the active exosuit.

Figure 18:
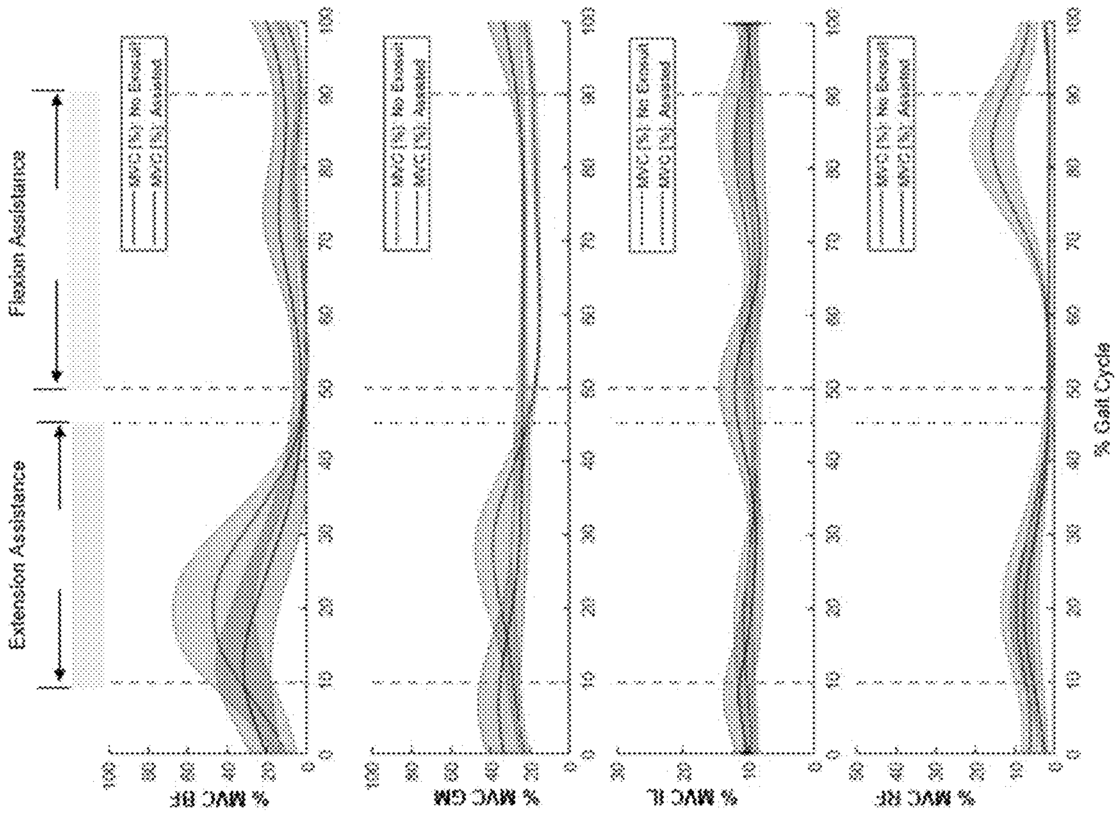
FIG. 18 depicts the relative EMG reduction for a representative participant across the gait cycle for the biceps femoris (BF) and gluteus maximus (GM) muscles (to assess extension effort reduction), and the iliacus (IL) and rectus femoris (RF) muscles (to assess flexion effort reduction) during active use of an exosuit, in accordance with an embodiment.
Figure 19:
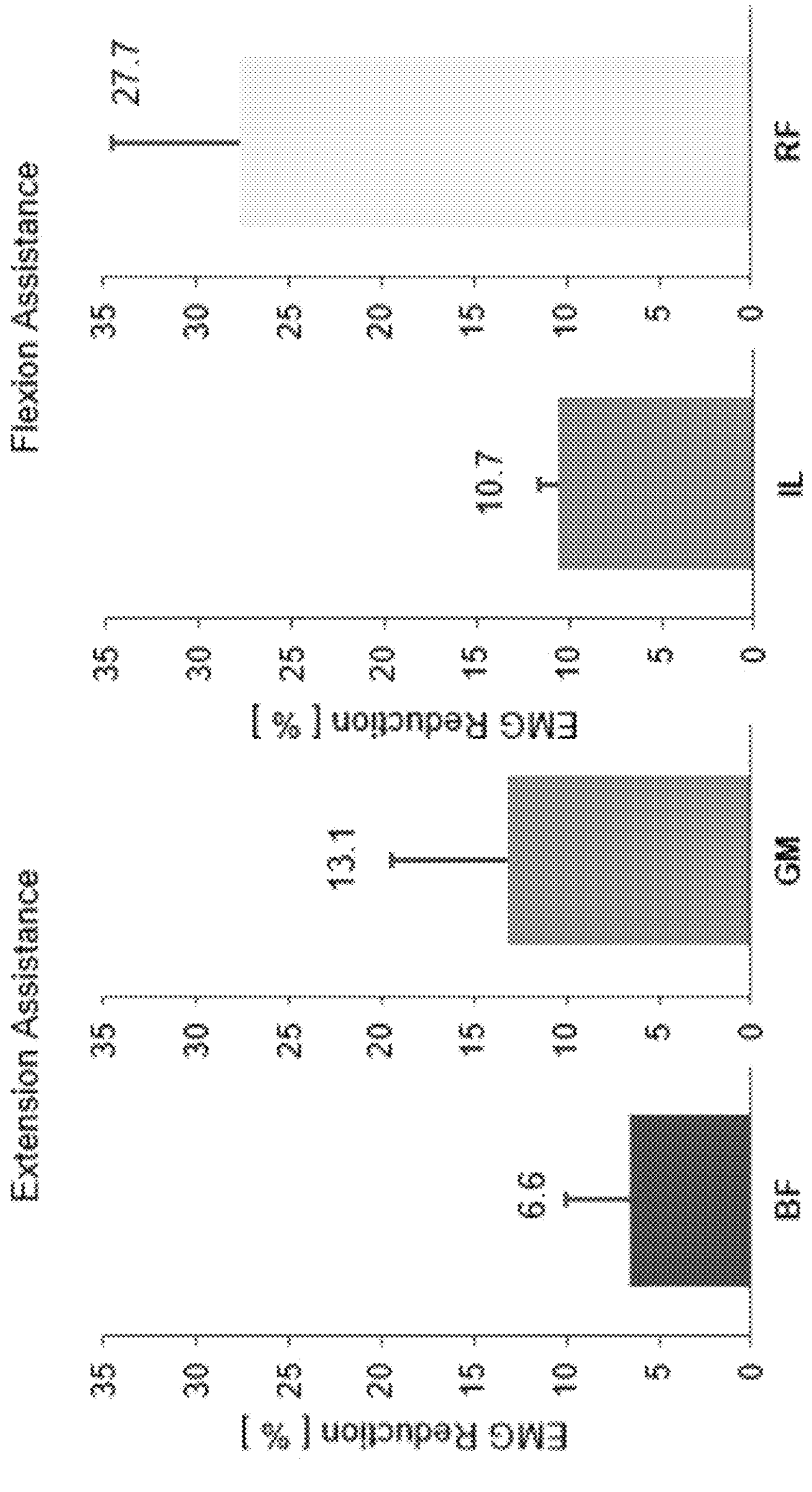
FIG. 19 depicts the EMG area reduction from 50-90% of the gait cycle for flexion assistance of the iliacus (IL) and rectus femoris (RF) muscles, and 10-45% of the gait cycle for extension assistance of the biceps femoris (BF) and gluteus maximus (GM) muscles during active use of an exosuit, in accordance with an embodiment.

FIG. 18 depicts the relative EMG reduction for a representative participant across the gait cycle for the BF and GM (to assess extension effort reduction), and the IL and RF (to assess flexion effort reduction). The EMG activity was evaluated for the IL and RF muscles during hip flexion and showed 10.7±1.4% and 27.7±14.2% reduction, respectively. For hip extension, the reduction of muscle activity was 13.1±5.1% for the GM and 6.6±3.6% for the BF. No major impact was observed for antagonistic muscle pairings during opposing gait cycle timings. FIG. 19 depicts the EMG area reduction from 50-90% of the gait cycle for flexion assistance of the IL and RF muscles, and 10-45% of the gait cycle for extension assistance of the GM and BF muscles.

While the present disclosure has been illustrated by the description of exemplary embodiments thereof, and while the embodiments have been described in certain detail, the Applicant does not intend to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions, or biological systems, which can, of course, vary. It is also to be understood that the terminology used herein is for the purpose of describing particular embodiments only and is not intended to be limiting.

Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A hip exosuit comprising:

a hip belt comprising one or more removably attached hip anchors;

a leg brace;

one or more anterior actuators, wherein each of the one or more anterior actuators is attached at a first end to a hip anchor, wherein each of the one or more anterior actuators is attached at a second end to the leg brace; and one or more posterior actuators, wherein each of the one or more posterior actuators is attached at a first end to a hip anchor, wherein each of the one or more posterior actuators is attached at a second end to the leg brace, wherein the one or more anterior actuators and one or more posterior actuators comprise one or more flat fabric pneumatic artificial muscles (ff-PAMs), wherein each ff-PAM comprises a plurality of pressure chambers, wherein an inflated state of each plurality of pressure chambers contracts the respective ff-PAM, wherein each of the one or more anterior actuators is configured to contract in response to a first signal, and wherein each of the one or more posterior actuators is configured to contract in response to a second signal.

2. The hip exosuit of claim 1, wherein:

the one or more anterior actuators comprise a first anterior actuator and a second anterior actuator, the hip anchor attached to the first anterior actuator is attached to the hip belt in an anteromedial location, the hip anchor attached to the second anterior actuator is attached to the hip belt in an anterolateral location, and the first anterior actuator and the second anterior actuator are attached to the leg brace in an anterolateral location and an anteromedial location, respectively.

3. The hip exosuit of claim 2, wherein:
the one or more posterior actuators comprise a first posterior actuator and a second posterior actuator,
the hip anchor attached to the first posterior actuator is attached to the hip belt in a posteromedial location,
the hip anchor attached to the second posterior actuator is attached to the hip belt in a posterolateral location, and
the first posterior actuator and the second posterior actuator are attached to the leg brace in a posterolateral location and a posteromedial location, respectively.

4. The hip exosuit of claim 1, further comprising at least one pressure regulator interfaced to the one or more anterior actuators and the one or more posterior actuators.

5. The hip exosuit of claim 4, wherein the at least one pressure regulator is contained in a wearable pouch.

6. The hip exosuit of claim 1, wherein each hip anchor is configured to allow adjustment of the placement of the attached anterior or posterior actuator.

7. The hip exosuit of claim 1, wherein the one or more anterior actuators and the one or more posterior actuators each comprise a soft and compliant material.

8. The hip exosuit of claim 7, wherein the soft and compliant material comprises at least one of neoprene, spandex, and nylon.

9. The hip exosuit of claim 3, wherein the first anterior actuator and the second anterior actuator cross over one another to form an X configuration, and wherein the first posterior actuator and the second posterior actuator cross over one another to form an X configuration.

10. The hip exosuit of claim 1, further comprising:
a control circuit configured to produce the first and second signal; and
one or more pressure sensors, interfaced to the control circuit.

11. The hip exosuit of claim 10, wherein:
the one or more pressure sensors monitor the pressure in at least one of:
the one or more anterior actuators, or
the one or more posterior actuators.

12. A method of assisting a motion of a hip of a subject, the method comprising:
applying the hip exosuit of claim 1 to the hip of the subject;
contracting the one or more anterior actuators in response to the first signal; and
contracting the one or more posterior actuators in response to the second signal.

13. The method of claim 12, wherein the motion comprises flexion, extension, or a combination thereof.

14. A hip exosuit comprising:
a hip belt comprising one or more removably attached hip anchors;
a leg brace;
a first actuator; and
a second actuator;
wherein the hip anchor attached to the first actuator is attached to the hip belt in an anterior location and the hip anchor attached to the second actuator is attached to the hip belt in a medial location,
wherein the first actuator and the second actuator are attached to the leg brace in a medial location and an anterior location, respectively,
wherein the first actuator and the second actuator comprise one or more flat fabric pneumatic artificial muscles (ff-PAMs), wherein each ff-PAM comprises a plurality of pressure chambers, wherein an inflated state of each plurality of pressure chambers contracts the respective ff-PAM, and
wherein the first and second actuator are configured to contract in response to a signal.

15. The hip exosuit of claim 14, wherein the hip anchor is adjustable.

16. The hip exosuit of claim 15, wherein the hip anchor is configured to allow adjustments in placement of the first actuator or the second actuator.

17. The hip exosuit of claim 14, wherein the first actuator and the second actuator cross over one another to form an X configuration.

18. The hip exosuit of claim 17, wherein the first actuator and the second actuator each comprise two ff-PAMs arranged in parallel.

19. The hip exosuit of claim 18, wherein the plurality of pressure chambers are separated via a seal.

20. The hip exosuit of claim 14,
further comprising a third actuator and a fourth actuator;
wherein the hip anchor attached to the third actuator is attached to the hip belt in a medial location, and the hip anchor attached to the fourth actuator is attached to the hip belt in a posterior location,
wherein the third actuator and the fourth actuator are attached to the leg brace in a posterior location and a medial location, respectively,
wherein the third actuator and the fourth actuator comprise one or more flat fabric pneumatic artificial muscles (ff-PAMs), wherein each ff-PAM comprises a plurality of pressure chambers, wherein an inflated state of each plurality of pressure chambers contracts the respective ff-PAM,
wherein the third and fourth actuator are configured to contract in response to a signal,
wherein the first actuator and the second actuator cross over one another to form an X configuration, and wherein the third actuator and the fourth actuator cross over one another to form an X configuration,
wherein the first, second, third and fourth actuator each comprise two ff-PAMs arranged in parallel.

* * * * *